United States Patent
Matsuura et al.

[11] Patent Number: 6,023,649
[45] Date of Patent: Feb. 8, 2000

[54] ANTISKID CONTROLLER

[75] Inventors: Masahiro Matsuura; Tsuyoshi Ochi, both of Kariya; Hidenori Terao, Nagoya; Syouichi Masaki, Chiryu, all of Japan

[73] Assignee: Nippondenso Co., Ltd., Kariya, Japan

[21] Appl. No.: 08/600,218

[22] Filed: Feb. 12, 1996

[30] Foreign Application Priority Data

Jul. 19, 1994 [JP] Japan ................................ 6-167022
Apr. 28, 1995 [JP] Japan ........................... PCT/JP95/859

[51] Int. Cl.$^7$ ....................................................... G06F 7/00
[52] U.S. Cl. .................................. 701/71; 701/79; 701/80; 180/197; 303/150
[58] Field of Search ............................ 701/71, 74, 78, 701/79, 80; 303/150, 156, 169; 180/197

[56] References Cited

U.S. PATENT DOCUMENTS

| | | | |
|---|---|---|---|
| 5,028,095 | 7/1991 | Okubo | 303/156 |
| 5,065,327 | 11/1991 | Yahagi et al. | |
| 5,079,709 | 1/1992 | Hirako et al. | 180/197 |
| 5,092,662 | 3/1992 | Okubo | 303/150 |
| 5,105,359 | 4/1992 | Okubo | 701/80 |
| 5,172,319 | 12/1992 | Shiraishi et al. | 180/197 |
| 5,257,192 | 10/1993 | Masaki | 701/79 |
| 5,328,006 | 7/1994 | Tsuyama et al. | 180/197 |
| 5,443,583 | 8/1995 | Sugawara et al. | 303/169 |
| 5,634,699 | 6/1997 | Ichikawa et al. | 303/150 |

FOREIGN PATENT DOCUMENTS

| | | |
|---|---|---|
| 64-63458 | 3/1989 | Japan . |
| 4-24155 | 1/1992 | Japan . |
| 4-118350 | 4/1992 | Japan . |
| 4-345562 | 12/1992 | Japan . |
| 2 221 758 | 2/1990 | United Kingdom . |

Primary Examiner—William A. Cuchlinski, Jr.
Assistant Examiner—Arthur D. Donnelly
Attorney, Agent, or Firm—Pillsbury Madison & Sutro LLP

[57] ABSTRACT

The invention provides an anti-skid controller capable of correctly executing ABS control by accurately estimating a road surface $\mu$ without using additional sensors. Each wheel speed is detected, and acceleration of the vehicle body in a case where a wheel speed difference between front and rear wheels exceeds a specified value is determined. In this case, by using a change rate within a specified period of time with respect to a wheel speed of one in which wheel speed changing is small as the acceleration, a road surface $\mu$ corresponding to the acceleration is determined. Corrections regarding turning, bad road travelling, road surface changing, etc. can be carried out, by determining a lateral G based on a speed difference between left and right wheels.

38 Claims, 23 Drawing Sheets

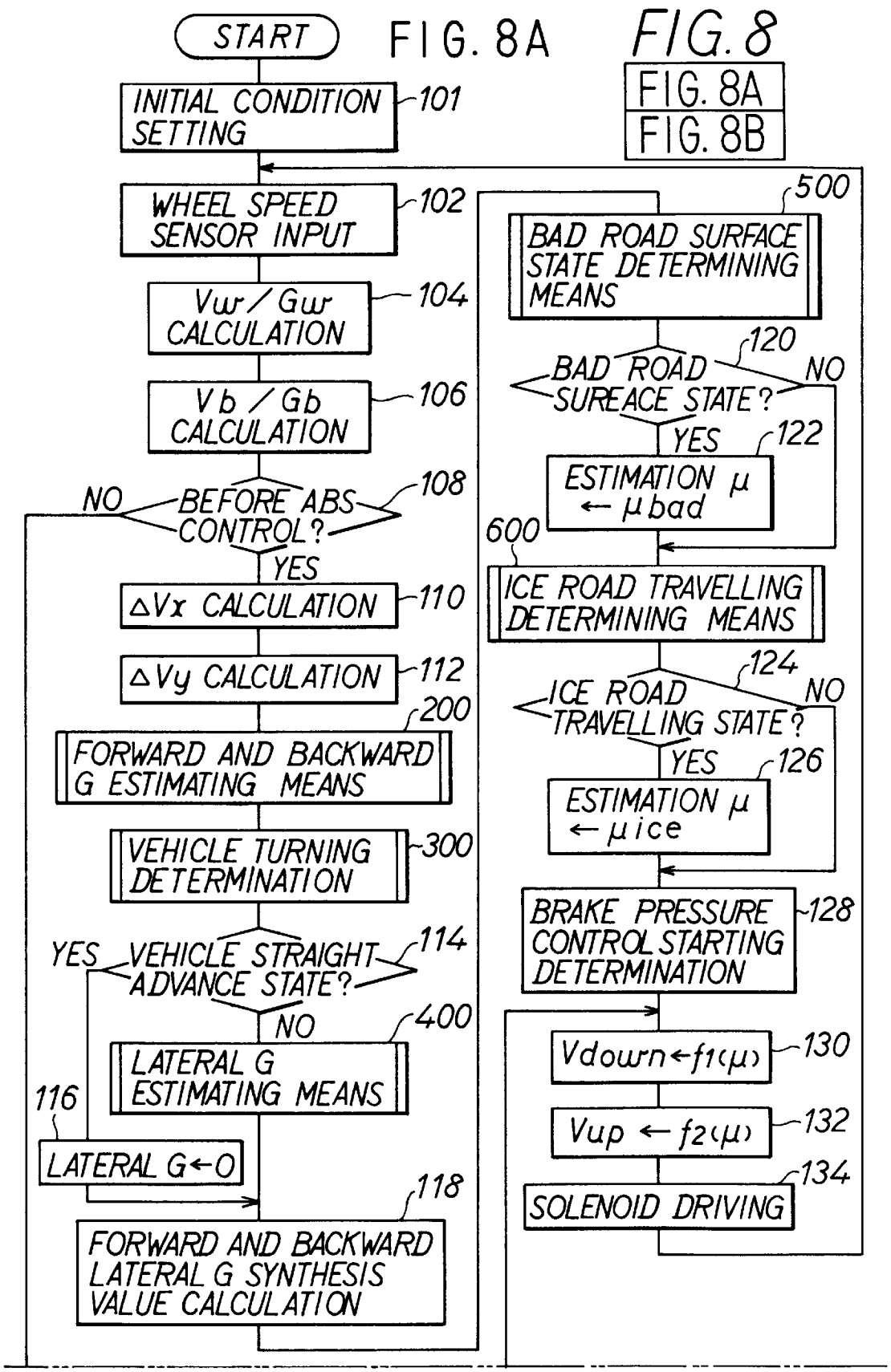

ANTISKID CONTROLLER

This is a continuation of International Application PCT/JP95/00859 with an international filing date of Apr. 28, 1995, now abandoned.

FIELD OF THE INVENTION

The present invention relates to a vehicular antiskid controller, and in particular to a controller wherein vehicular braking performance and stabilizing performance are improved by switching various control references to values suited to friction coefficients without using a special, additional sensor, such as a G sensor.

BACKGROUND ART

Frictional coupling in a vehicle between a tire and a road surface is important for safe travelling of the vehicle. This is because for any dynamic process (accelerating the vehicle by operating an accelerating pedal and decelerating the vehicle by operating a brake pedal, etc.) it is necessary to transmit between the tire and the road surface a force corresponding to the dynamic process. Frictional coupling between the tire and the road surface depends on specific slipping of a wheel, and when the specific slipping exceeds a specified range, frictional coupling is weakened and the vehicle becomes unstable.

Controllers for preventing a specific slipping rate of a vehicle from exceeding a specified range at times of decelerating or accelerating a vehicle are known. In these controllers, rotational speed and acceleration of a wheel are detected by means of a wheel sensor, and based on values thus obtained and other measured values, a wheel specific slipping rate etc., are calculated in an electronic evaluation controller. Antiskid controllers have been devised wherein braking pressure is reduced by a suitable controller when wheel slipping exceeds a specified range and braking pressure is increased when wheel speed is restored and the amount of wheel slipping becomes acceptable, so that braking distance is shortened by obtaining a vehicle braking force that is as strong as possible.

In the above-described antiskid controller, if the level of frictional coupling between the wheel tire and the road surface is known prior to starting of control, a control suited to the level of coupling between the tire and the road surface can be carried out from the start of the control. That is, where the level of coupling between the tire and the road surface differs from known values, in other words road surface friction coefficient becomes different, control of brake liquid pressure accompanying movements of wheels may be different based on wheel speed reduction timing differences between front and rear wheels.

Thus, for instance Japanese Unexamined Patent Publication No. 4-345562 describes a method for executing antiskid controls by obtaining a wheel speed difference between the front and rear wheels of the vehicle, estimating whether a level of friction on the road surface is low (hereinafter called low $\mu$ road) or high (high $\mu$ road) based on a relationship between the wheel speed difference and the duration of a state in which the difference exists and using a result of the estimation for antiskid control.

Such an antiskid control method, however, only determines whether the road surface on which the vehicle travels is a high $\mu$ road or a low $\mu$ road based on the relationship between the speed difference between front and rear wheels and the duration of the speed difference, and not on specific road surface friction coefficients corresponding to continuously changing road surface situations. Therefore, for example, only determination of low $\mu$ roads and high $\mu$ roads can be realized, and a medium $\mu$ road surface including a wet road, a compressed snow road or the like must simply be determined as either the high $\mu$ road surface or as the low $\mu$ road surface. If the vehicle is controlled based on this kind of determination, vehicle control may become unstable. A vehicle body speed is used as a reference for determining the above-described wheel slipping ratio. If the vehicle body speed is not correctly calculated, the starting time of the antiskid control may not be accurately determined or control of brake fluid pressure may not be accurately executed. Thus, an optimum braking force cannot be obtained. In this kind of antiskid controller, usually the vehicle body speed of a two-wheel-drive vehicle is estimated from the wheel speeds of four wheels, and if braking hydraulic pressure is reduced by means of ABS control after starting braking of the vehicle, the reduced speed of a rolling wheel is restored to the vicinity of the actual vehicle body speed. Therefore, an estimated vehicle body speed calculated from the wheel speeds of four wheels is almost equal to the actual vehicle body speed, and thus, nearly accurate ABS control performance can be obtained. In a case where more accurate control is desired, even in ABS for the two-wheel-drive vehicle, an attempt has been made to estimate an accurate vehicle body speed by adding an acceleration sensor for detecting acceleration and deceleration of a vehicle body or by dividing road surface friction coefficients into categories by using the method described in the above-described publication.

On the other hand, in the case of a four-wheel-drive vehicle, four wheels are simultaneously driven by means of mechanical coupling of a differential gear and are greatly affected by engine torque and transmission torque. Thus, even though braking hydraulic pressure is reduced by means of ABS control after a start of braking, a wheel speed may not be restored to the vicinity of the real vehicle body speed as in the case of the two-wheel-drive vehicle. Rather, estimated vehicle body speed deviates from the real vehicle body speed and, particularly on a road surface where a surface friction coefficient (road surface $\mu$) is extremely low (extremely low $\mu$ road) such as on an icy road and the like, the difference between estimated and actual speeds becomes greater. In this case, a reference speed and the like for reducing pressure are set so low that slipping of the wheels increases.

Given this situation, for a four-wheel-drive vehicle, the road surface $\mu$ is estimated by means of an additional sensor, such as a G sensor, for detecting deceleration of the vehicle body. Then, based on this road surface $\mu$, optimizing ABS control is carried out by switching the estimated vehicle body speed and various control references to values suited to the estimated road surface $\mu$.

Therefore, it is apparent that the additional sensor such as the G sensor for detecting deceleration of the vehicle speed is essential to ABS for four-wheel-drive vehicles compared with other systems for two-wheel-drive vehicles. The system is specialized for the four-wheel-drive vehicle, not only causing an increase in cost but also necessitating a different control from that for the two-wheel-drive vehicle, and a common system for all kinds of vehicles is not possible.

The present invention is made in view of these problems and it is an object of the invention to provide an antiskid controller wherein, without using an additional sensor such as an acceleration sensor (or a G sensor), a road surface $\mu$ can be correctly estimated in accordance with changing conditions of road surfaces and antiskid control can be accurately executed by using the estimated value.

SUMMARY OF THE INVENTION

In order to solve the above-described problems, the present invention employs an antiskid controller characterized in that the controller is provided with wheel speed detecting means for detecting a wheel speed of each wheel of a vehicle, vehicle body speed calculating means for calculating a vehicle body speed of the vehicle based on the wheel speed, calculating means for calculating an average changing gradient over a specified period of time of one wheel speed of the front or rear wheel in which a speed change within the specified period of time is smallest, determining means for determining whether a changing ratio with respect to a difference in wheel speeds between the front and rear wheels within a specified period of time reaches a specified value or higher, estimating means for estimating, when the determining means determines that the changing ratio reaches the specified value or higher, a friction coefficient between a road surface travelled by the vehicle and the wheel based on the average changing gradient calculated immediately before the changing ratio reaches the specified value, and braking pressure control means for controlling, in order to prevent excess slipping of a tire of a controlled wheel based on a comparison between the vehicle body speed and the speed of the controlled wheel, braking pressure of the controlled wheel in accordance with antiskid control reference determined by at least using the friction coefficient.

According to the present invention, the average changing gradient of one wheel speed of the wheel in which speed change is smallest is calculated by the calculating means. The determining means determines a time for estimating the friction coefficient of a road surface by the estimating means by using the average changing gradient calculated by the calculating means. Then, with this time, antiskid control references such as antiskid control starting time and the like are set based on the estimated friction coefficient, and control of braking pressure is executed to eliminate excess slipping of the controlled wheel.

In the vehicle, a difference in braking torques given by each of the front and rear wheels at the time of applying a brake is set in order to prevent the rear wheels from reaching a locked state earlier than the front wheels to maintain stability of the vehicle during braking. Thus, between the front and rear wheels, this results in a difference in timings in which the wheel speeds drop suddenly exceeding a $\mu$ peak in a $\mu$–s characteristic. As described above, since the difference in braking torques given to the front and rear wheels is set, it can be expected that when a wheel speed of one wheel suddenly declines exceeding the $\mu$ peak, the other wheel is controlled almost in the vicinity of the $\mu$ peak. Thus, with respect to relative changes in wheel speeds between the front and rear wheels, a changing ratio of one wheel speed in which a speed change at a time when a difference in wheel speeds exceeding a specified level occurs is small, that is, a changing gradient in the wheel speed at a high speed side is in the vicinity of the $\mu$ peak. Thus, a changing ratio of the wheel speed determined at the $\mu$ peak may correspond to a current friction coefficient of the road surface, and friction coefficients of road surfaces can be accurately estimated simply from the changing gradient of the wheel speed without using an additional sensor such as the G sensor or the like. Moreover, by averaging and detecting the changing gradients, road surface friction coefficients can be more accurately determined. If antiskid control reference is set by using the estimated values of friction coefficients and antiskid control is executed according to this, antiskid control can be accurately executed and optimum braking can be obtained.

It is possible to employ an antiskid controller characterized in that the controller is provided with wheel speed detecting means for detecting a wheel speed of each wheel of a vehicle, calculating means for calculating an average changing gradient over a specified period of time of one wheel speed of the front and rear wheels in which speed change within the specified period of time is smallest, forward and backward direction acceleration calculating means for calculating, as forward and backward direction acceleration of the vehicle corresponding to a road surface friction coefficient, the average changing gradient calculated by the calculating means based on relative changes in wheel speeds between the front and rear wheels detected by the wheel speed detecting means, vehicle body speed calculating means for calculating the vehicle body speed by using at least the forward and backward direction acceleration, and braking pressure control means for controlling braking pressure of controlled wheel in order to prevent excess slipping thereof based on comparison between the vehicle body speed and the wheel speed of the controlled wheel.

In the antiskid controller of this type, the average changing gradient is calculated as forward and backward direction acceleration by the calculating means based on relative changes in wheel speeds between the front and rear wheels. The calculated forward and backward direction acceleration is a value corresponding to a road surface on which a vehicle travels when a braking force needs to be as strong as possible, and thus road surface friction coefficients can be accurately estimated from the forward and backward direction acceleration.

It is possible to employ another antiskid controller characterized in that the controller is provided with wheel speed detecting means for detecting a wheel speed of each wheel of a vehicle, vehicle body speed calculating means for calculating a vehicle body speed of the vehicle based on the wheel speed, determining means for determining whether a changing ratio with respect to a difference in wheel speeds between the front and rear wheels within a specified period of time reaches a specified value or higher, forward and backward direction acceleration calculating means for calculating forward and backward direction acceleration corresponding to a friction coefficient of the travelled road surface for travelling immediately before the determining means determines that the changing ratio reaches the specified value or higher based on relative changes in wheel speeds between the front and rear wheels detected by the wheel speed detecting means, estimating means for estimating a friction coefficient between the wheel and the road surface for travelling based on forward and backward direction acceleration calculated by the forward and backward direction calculating means, and braking pressure control means for controlling braking pressure of controlled wheel in accordance with antiskid control reference determined by using at least the friction coefficient in order to prevent excess slipping of the controlled wheel based on comparison between the vehicle body speed and the controlled wheel speed.

In the antiskid controller of this type, when the determining means determines that the changing ratio reaches the specified value or higher, that is, at a timing when forward and backward direction acceleration accurately represents the road surface friction coefficient, forward and backward direction acceleration is calculated by the forward and backward direction acceleration means. Then, by using this forward and backward direction acceleration, the road surface friction coefficient is estimated by the estimating means, and by using the estimated friction coefficient value, the antiskid control reference is set. Thus, if the antiskid control reference is set by using the friction coefficient value accurately estimated from forward and backward direction acceleration, accurate antiskid control can be carried out according to a condition on a road surface.

It is also possible to employ an antiskid controller characterized in that the determining means is determined whether a changing ratio within a specified period of time with respect to an integrated value obtained by periodically and sequentially integrating differences in wheel speeds between the front and rear wheels of the vehicle reaches a specified value or higher.

In this way, even if noise components, etc., are contained in a detected value of each wheel speed, adverse effects of noises can be reduced by means of periodical integration.

It is possible to employ still another antiskid controller characterized in that the controller is provided with wheel speed detecting means for detecting a wheel speed of each wheel of a vehicle, forward and backward direction acceleration calculating means for calculating, based on relative changes in wheel speeds between front and rear wheels detected by the wheel speed detecting means, forward and backward direction acceleration corresponding to a road surface friction coefficient, lateral direction acceleration calculating means for calculating lateral direction acceleration of the vehicle, based on speeds of right and left wheels detected by the wheel speed detecting means, deceleration limit gradient calculating means for calculating a deceleration limit gradient of the vehicle from the forward and backward direction acceleration and the lateral direction acceleration, vehicle body speed calculating means for calculating a vehicle body speed of the vehicle by using at least the deceleration limit gradient, and braking pressure control means for controlling braking pressure of controlled wheel in order to prevent excess slipping of controlled wheel based on a comparison between the vehicle body speed and wheel speed of the controlled wheels.

That is, here, in addition to calculation of forward and backward direction acceleration, lateral direction acceleration of the vehicle is calculated based on speeds of right and left wheels. Then, the deceleration limit gradient is calculated based on the forward and backward direction acceleration and the lateral direction acceleration. At the time of turning and braking of the vehicle, etc., frictional coupling between each wheel and the road surface is divided into a friction force for decelerating the vehicle and a cornering force (lateral direction inertial force) for turning the vehicle. Therefore, from the forward and backward direction acceleration and the lateral direction acceleration equivalent to these forces, the deceleration limit gradient really corresponding to the friction coupling force between the wheel and the road surface can be obtained.

By obtaining the vehicle body speed in accordance with the deceleration limit gradient thus obtained, the vehicle body speed, one of the antiskid control references, can be accurately obtained without using a load sensor such as a G sensor or the like. Therefore, by executing braking pressure control with the vehicle body speed as reference, braking efficiency can be increased and stability can be obtained.

It is also possible to employ an antiskid controller characterized in that the controller is provided with wheel speed detecting means for detecting a wheel speed of each wheel of a vehicle, forward and backward direction acceleration calculating means for calculating forward and backward direction acceleration corresponding to a road surface friction coefficient based on relative changes in wheel speeds between front and rear wheels detected by the wheel speed detecting means in a state before braking pressure control is started after braking torque is applied to the front and rear wheels of the vehicle, lateral direction acceleration calculating means for calculating lateral direction acceleration of the vehicle based on speeds of right and left wheels detected by the wheel speed detecting means in a state before braking pressure control is started after braking torque is applied to the front and rear wheels of the vehicle, deceleration limit gradient calculating means for calculating a deceleration limit gradient of the vehicle from the forward and backward direction acceleration and the lateral direction acceleration, vehicle body speed calculating means for calculating a vehicle body speed of the vehicle by using at least the deceleration limit gradient, and braking pressure control means for controlling braking pressure of controlled wheel in order to prevent excess slipping of the controlled wheel based on a comparison between the vehicle body speed and the wheel speed of the controlled wheel.

The basic effect of the controller of the present invention is the same as in the cases of the previously described controllers, and according to the invention it is specified that a period for obtaining the forward and backward direction acceleration and lateral direction acceleration is during travelling of the vehicle or application of a brake.

With the controller thus structured, forward and backward direction acceleration and lateral direction acceleration is obtained only in a state where almost equivalent braking torque is applied as a ratio to a set load. Therefore, an accurate deceleration limit gradient can be obtained from the forward and backward direction acceleration properly corresponding to a road surface friction coefficient of the vehicle and the lateral direction acceleration corresponding to the turning state.

The forward and backward direction acceleration calculating means may calculate acceleration in forward and backward directions corresponding to the road surface friction coefficient based on a changing ratio of a wheel speed on a high speed side if a difference in wheel speeds between the front and rear wheels produces a change equal to or higher than a specified value when braking torque is applied to the front and rear wheels of the vehicle.

Furthermore, the forward and backward direction acceleration calculating means may calculate acceleration in forward and backward directions corresponding to a road surface friction coefficient based on a changing ratio of a wheel speed of a front wheel or a rear wheel when braking pressure control is started in a case where a difference in wheel speeds between the front and rear wheels does not produce a change equal to or higher than a specified value and braking pressure control is started for the front or the rear wheel.

In this case, it cannot be necessarily true that the calculated forward and backward direction acceleration accurately corresponds to the road surface friction coefficient. It can be true, however, that as long as braking pressure control is in operation, the changing ratio of the wheel speed calculated when slipping of wheels is a problem corresponds to that of the wheel speed at least equal to or higher than a $\mu$ peak. In this case, there is not such a big problem, for an inclination of a deceleration limit gradient is greater and the vehicle is in a direction for further deceleration.

Furthermore, it is possible to employ an antiskid controller characterized in that the controller is provided with determining means for determining whether a road surface on which a vehicle travels is bad or not based on a changing state of a wheel speed, and correcting means for correcting the deceleration limit gradient calculated by the deceleration limit gradient calculating means to correspond to the bad road when the road surface on which the vehicle travels is found to be bad by the determining means.

The correcting means may be caused to correct the deceleration limit calculated by the deceleration limit gradient calculating means to a bad road deceleration limit gradient value set beforehand in consideration of the bad road.

It is also possible to employ an antiskid controller characterized in that the controller is provided with determining means for determining whether a road surface on which a vehicle travels is an extremely low friction road surface or not based on a changing state of a wheel speed at least when braking torque changes, and correcting means for correcting a deceleration limit gradient calculated by the deceleration limit gradient calculating means to one corresponding to an extremely low friction road surface when the determining means determines that the road surface on which the vehicle travels is an extremely low friction road surface.

The correcting means may correct a deceleration limit calculated by the deceleration limit gradient calculating means to a bad road deceleration limit gradient set beforehand in consideration of an extremely low friction road surface.

By executing these corrections, it is possible to properly deal with a situation where there are changes in a state of a road surface for travelling.

It is possible to employ an antiskid controller characterized in that the controller is provided with determining means for determining whether a deceleration limit gradient calculated by the deceleration limit gradient calculating means is suitable for a road surface for travelling or not based on a change in a wheel speed with respect to an increase or a decrease in braking pressure after antiskid control is started, and control correcting means for correcting the deceleration gradient when the determining means determines that the deceleration limit gradient is not suitable.

The determining means may determine that the deceleration limit gradient is not suitable in a case where a dropping level of a wheel speed is below a reference value even when braking pressure is increased more than a specified amount.

The determining means may determine that the deceleration limit gradient is not suitable in a case where a dropping level of a wheel speed is above a reference value even when braking pressure is decreased.

The determining means may also determine that the deceleration limit gradient is not suitable in a case where braking pressures in a plurality of wheels are simultaneously increased in antiskid control based on a wheel speed of each wheel.

The determining means may further determine that the deceleration limit gradient is not suitable in a case where a wheel speed reaches the vehicle body speed or higher.

An antiskid controller of the present invention can be applied to not only four-wheel-drive vehicles but also two-wheel-drive vehicles such as FF, FR and the like, and by utilizing techniques according to the present invention, performance can be further improved.

It is possible to employ an antiskid controller characterized in that the controller is provided with wheel speed detecting means for detecting a wheel speed of each wheel of a vehicle, vehicle body speed calculating means for obtaining a vehicle body speed based on a wheel speed of a rolling wheel of the wheels, calculating means for calculating an average changing gradient within a specified period of time of the vehicle body speed calculated by the vehicle body speed calculating means, determining means for determining whether a changing ratio within a specified period of time with respect to a difference between a wheel speed of rear wheels and the vehicle body speed or a difference between a wheel speed of front wheels and the vehicle body speed reaches a specified value or higher, estimating means for estimating a friction coefficient between a road surface for travelling and a wheel by means of the average changing gradient, when the determining means determines that the changing ratio reaches a specified value or higher, and braking pressure control means for controlling braking pressure of the controlled wheel according to antiskid control reference determined by using at least the friction coefficient in order to prevent excess slipping of the controlled wheel based on a comparison between the vehicle body speed and a speed of the controlled wheel.

Usually, since the rolling wheel exists in a two-wheel-drive vehicle such as FF, FR and the like, the speed of the rolling wheel can simply be used as the vehicle body speed. In this case, by the determining means, observation may be made on a difference between the vehicle body speed and speeds of the front and rear wheels.

It is possible to employ an antiskid controller characterized in that the controller is provided with wheel speed detecting means for detecting a wheel speed of each wheel of a vehicle, vehicle body calculating means for calculating a vehicle body speed based on each wheel speed, determining means for determining whether either a changing rate within a specified period of time with respect to a difference between a wheel speed of rear wheels and the vehicle body speed or a changing rate within a specified period of time with respect to a difference between a wheel speed of front wheels and the vehicle body speed reaches a specified value or higher, calculating means for calculating an average changing gradient of the other wheel speed when the determining means determines that a rate of change of one wheel reaches a specified value or higher, estimating means for estimating a friction coefficient between a road surface for travelling and the wheel by means of the average changing gradient calculated by the calculating means immediately before when the determining means determines that a rate of change of one wheel speed has reached a specified value or higher, and braking pressure control means for controlling braking pressure of the controlled wheel according to an antiskid control reference determined by using at least the friction coefficient in order to prevent excess slipping of a controlled wheel based on a comparison between the vehicle body speed and the speed of the controlled wheel.

Previously, with a difference in speeds among the front and rear wheels targeted for calculation, a timing of a $\mu$ peak on a road surface under one wheel was calculated by the determining means. However, it is apparent just from the above description that the same effect can be obtained by determining a difference between a wheel speed of the front wheel and a wheel speed of the rear wheels with a vehicle body speed as a reference, calculating a timing depending on whether a rate of change of one wheel speed reaches a specified value or higher and estimating a road surface friction coefficient from an average changing gradient of the other wheel speed.

The forward and backward direction acceleration calculating means may calculate acceleration in forward and backward directions corresponding to a road surface friction coefficient based on a changing rate of a wheel speed at a high speed side in a case where an integrated value obtained by periodically and sequentially integrated differences in speeds between the front and rear wheels has exceeded a specified value when braking torque is applied to the front and rear wheels of the vehicle.

BEST MODE FOR CARRYING OUT THE INVENTION

Embodiments of the invention will now be described with reference to the accompanying drawings.

Figure 1:
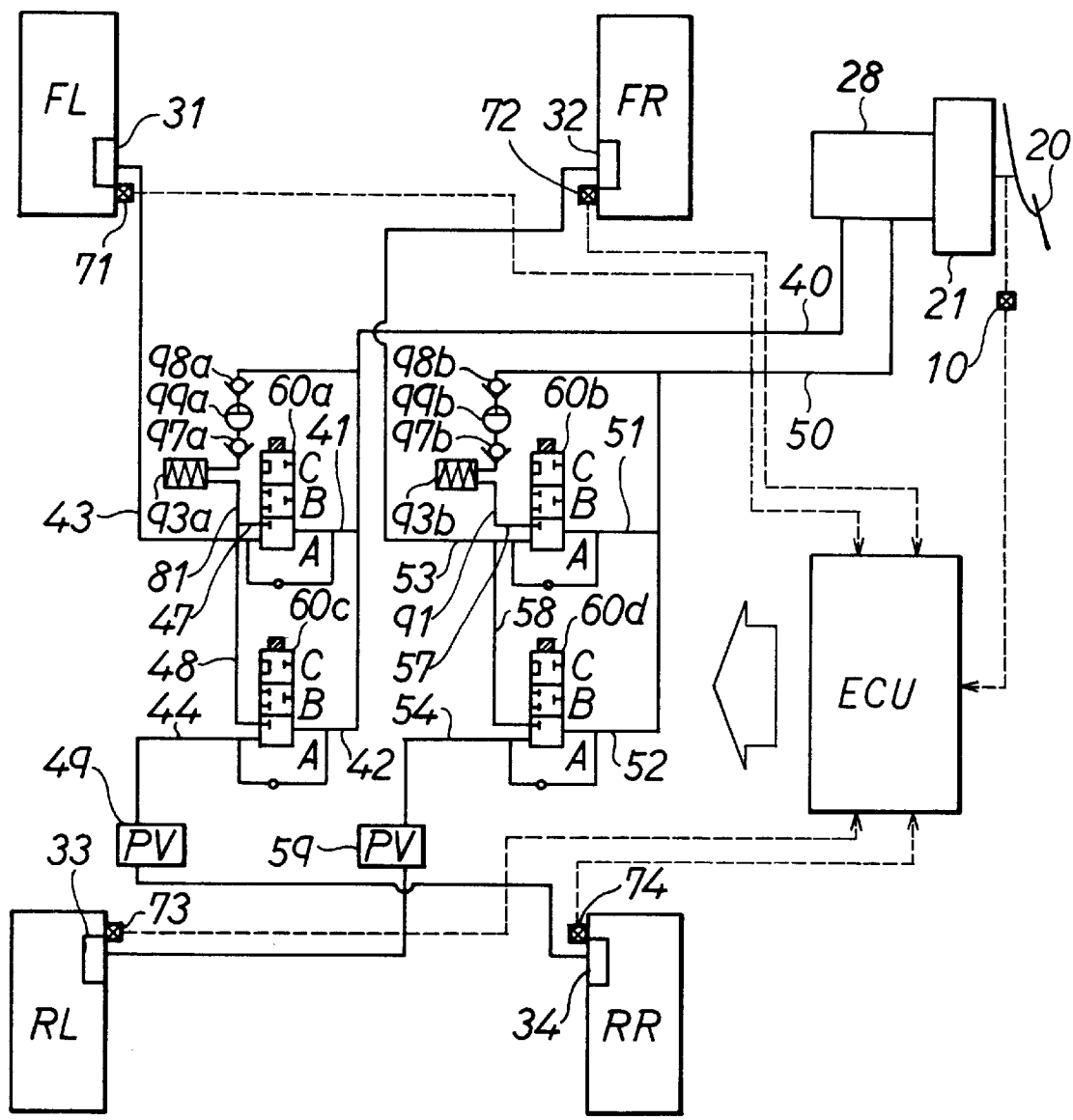
FIG. 1 is a block diagram showing an antiskid controller of a first embodiment of the present invention.

FIG. 1 is a block diagram showing a hydraulic circuit structure in an ABS controller in a first embodiment of the invention. In FIG. 1, a brake pedal 20 is connected to a master cylinder 28 via a vacuum booster 21. Thus, hydraulic pressure is generated in the master cylinder 28 by pressing the brake pedal 20, the hydraulic pressure is supplied to wheel cylinders 31, 32, 33 and 34 provided on respective wheels (left front wheel FL, right front wheel FR, left rear wheel RL and right rear wheel RR).

The master cylinder 28 is provided with two pressure chambers (not shown) in which similar brake hydraulic pressure is generated and supplying pipes 40 and 50 are connected to these pressure chambers.

The supplying pipe 40 is branched into communicating pipes 41 and 42. The communicating pipe 41 is connected, via a solenoid valve 60a, to a brake pipe 43 communicating with the wheel cylinder 31. Similarly, the communicating pipe 42 is connected, via a solenoid valve 60c, to a brake pipe 44 connected with the wheel cylinder 34.

As in the case of the supplying pipe 40, the supplying pipe 50 is branched into communicating pipes 51 and 52. The communicating pipe 51 is connected, via a solenoid valve 60b, to a brake pipe 53 communicating with the wheel cylinder 32. Similarly, the communicating pipe 52 is connected, via a solenoid valve 60d, to a brake pipe 54 communicating with the wheel cylinder 33.

In the brake pipes 54 and 44 connected to the wheel cylinders 33 and 34, known proportioning valves 59 and 49 are installed. The proportioning valves 59 and 49 are for bringing the distribution of a braking force among the front and rear wheels FL to RR closer to an ideal state by controlling a brake hydraulic pressure supplied to the rear wheels RL and RR.

Solenoid pickup type wheel speed sensors 71, 72, 73 and 74 are provided on the wheels FL to RR and signals thereof are input to an electronic control circuit ECU. The electronic control circuit ECU outputs driving signals to the solenoid valves 60a to 60d so as to control brake hydraulic pressure applied to the wheel cylinders 31 to 34 based on input speeds of the wheels FL to RR.

The solenoid valves 60a, 60b, 60c and 60d connect, in an A position of a 3-port 3-position type solenoid in FIG. 1, the communicating pipes 41, 42, 51 and 52 respectively with the brake pipes 43, 44, 53 and 54, and in a B position the valves cut off all communications among the communicating pipes 41, 42, 51 and 52, the brake pipes 43, 44, 53 and 54 and branch pipes 47, 48, 57 and 58. In a C position, the brake pipes 43, 44, 53 and 54 respectively communicate with the branch pipes 47, 48, 57 and 58.

The branch pipes 47 and 48 are connected to a discharge pipe 81, while the branch pipes 57 and 58 are connected to a discharge pipe 91. The discharge pipes 81 and 91 are connected respectively to reservoirs 93a and 93b. The reservoirs 93a and 93b are for temporarily storing brake fluid discharged from the wheel cylinders 31 to 34 when the solenoid valves 60a to 60d are in the C position. Thus, brake hydraulic pressure in the wheel cylinders 31 to 34 can be increased when the solenoid valves 60a to 60d are in the A position, brake hydraulic pressure can be held when the solenoid values 60a to 60d are in the B position and brake hydraulic pressure can be decreased when the solenoid values 60a to 60d are in the C position. The solenoid valves 60a and 60b function as braking force adjusting means.

Pumps 99a and 99b are for pumping up brake fluid stored in the reservoirs 93a and 93b and returning the brake fluid to the side of master cylinder 28. Check valves 97a, 98a, 97b and 98b are for preventing brake fluid pumped up from the reservoirs 93a and 93b from flowing back.

A stop switch 10 is for detecting whether a driver presses the brake pedal 20 or not.

Next, explanation will be made of ABS control executed in the first embodiment with reference to FIGS. 2 to 7.

Figure 2:
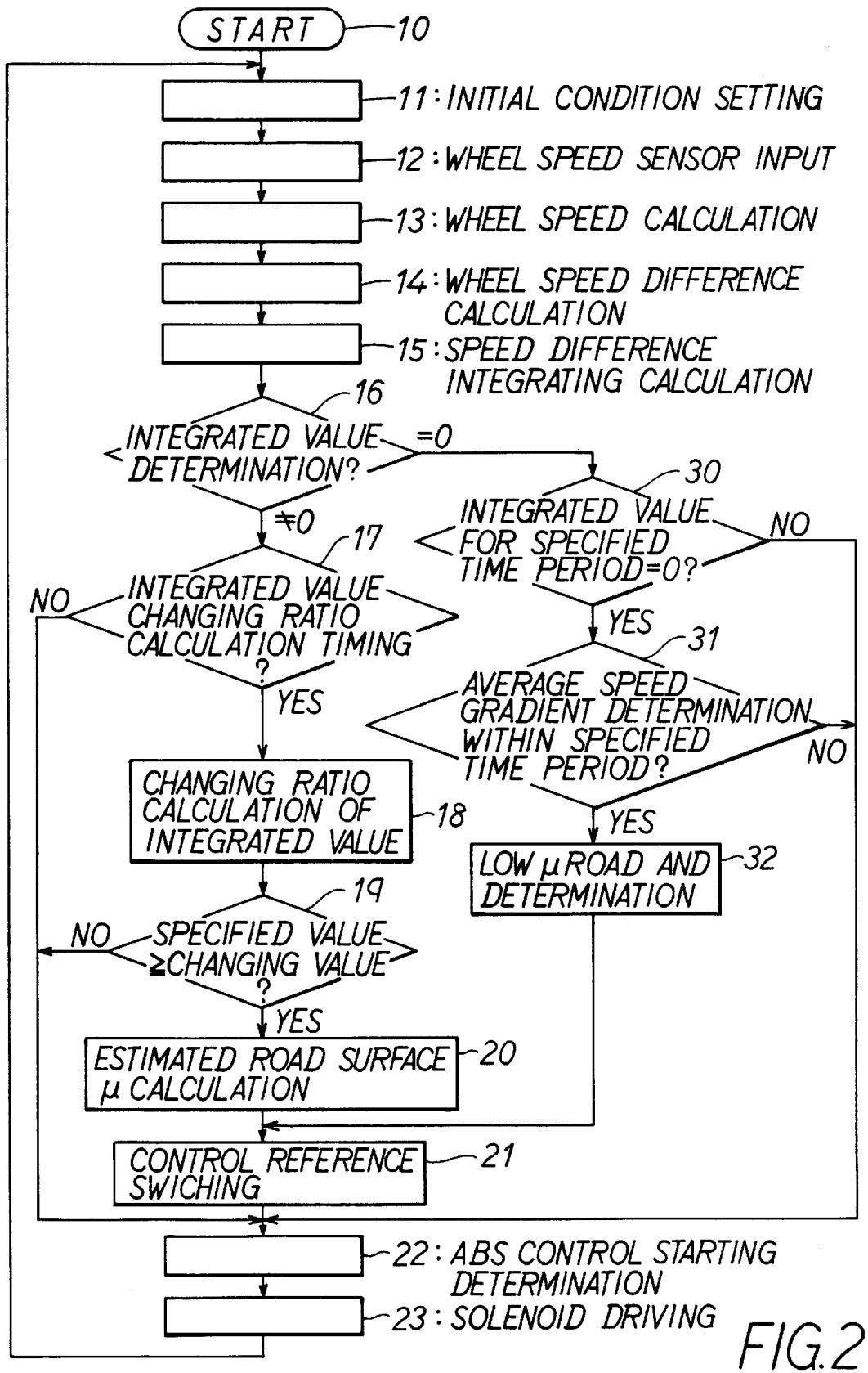
FIG. 2 is a flow chart of the first embodiment.

FIG. 2 is a flow chart showing a routine of the ABS controller of the first embodiment. This processing is started from a step 10 when an ignition switch (not shown) is switched ON.

After the processing is started, first, the initial setting of each flag and counter is carried out in step 11. In the following step 12, wheel speed signals from the wheel speed sensors 71 to 74 are input to a central arithmetic processing unit ECU 100. In step 13, based on signal inputs from the wheel speed sensors 71 to 74, wheel speed and acceleration (any one of FL to RR) of the controlled wheel are calculated. In step 14, a speed difference between the front and rear wheels is calculated. For the calculation of a front and rear wheel speed difference, the right side wheels and the left side wheels are calculated independently. A method for calculating an average value, for instance (FR wheel+FL wheel)/2− (RR wheel+RL wheel)/2 may be employed.

Figure 3:
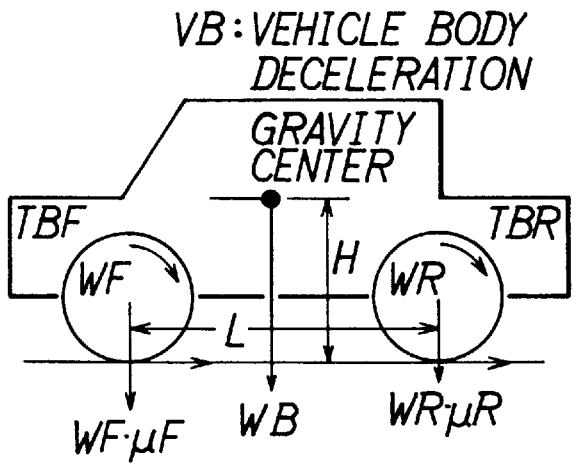
FIG. 3 is a view illustrating a motion equation of wheels.

It is apparent from a wheel motion equation (equation 1), as shown in FIG. 3, that dropping wheel speed ω of each wheel depends on a braking force TB.

$$\omega = (\mu * r * W - TB)/I \qquad \text{(Equation 1)}$$

Herein,

ω: wheel speed (wheel angular velocity)

μ: road surface friction coefficient r: wheel radius

W: wheel load

TB: braking force

I: inertia moment of wheel

Figure 4:
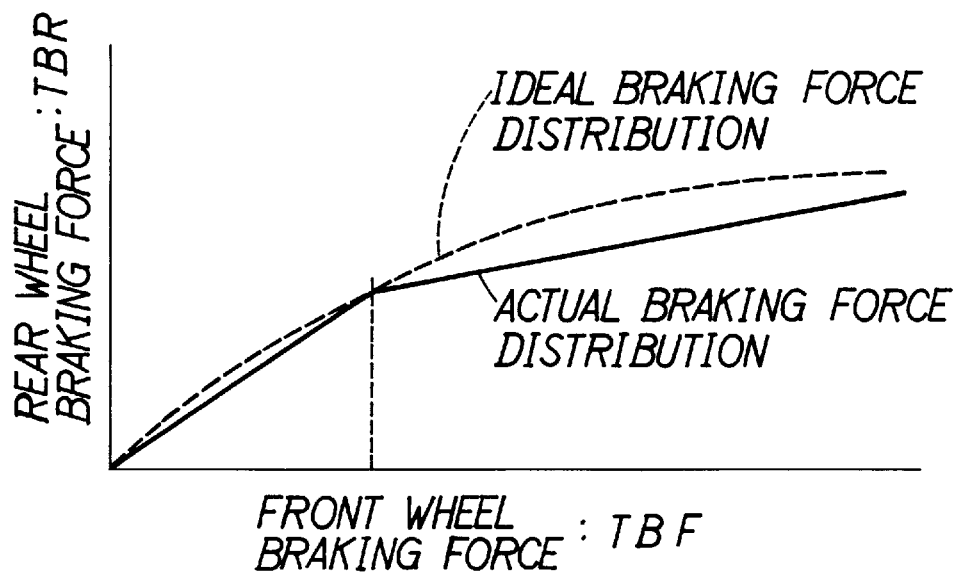
FIG. 4 is a graph showing braking force distribution lines of wheels in a vehicle.

As shown in FIG. 4, it is clear that the actual braking force is higher for the front wheels than for the rear wheels based on a braking force distribution line by the proportion valve. Thus, it is expected from equation 1 that a front wheel drops speed generally faster than a rear wheel.

Figure 5:
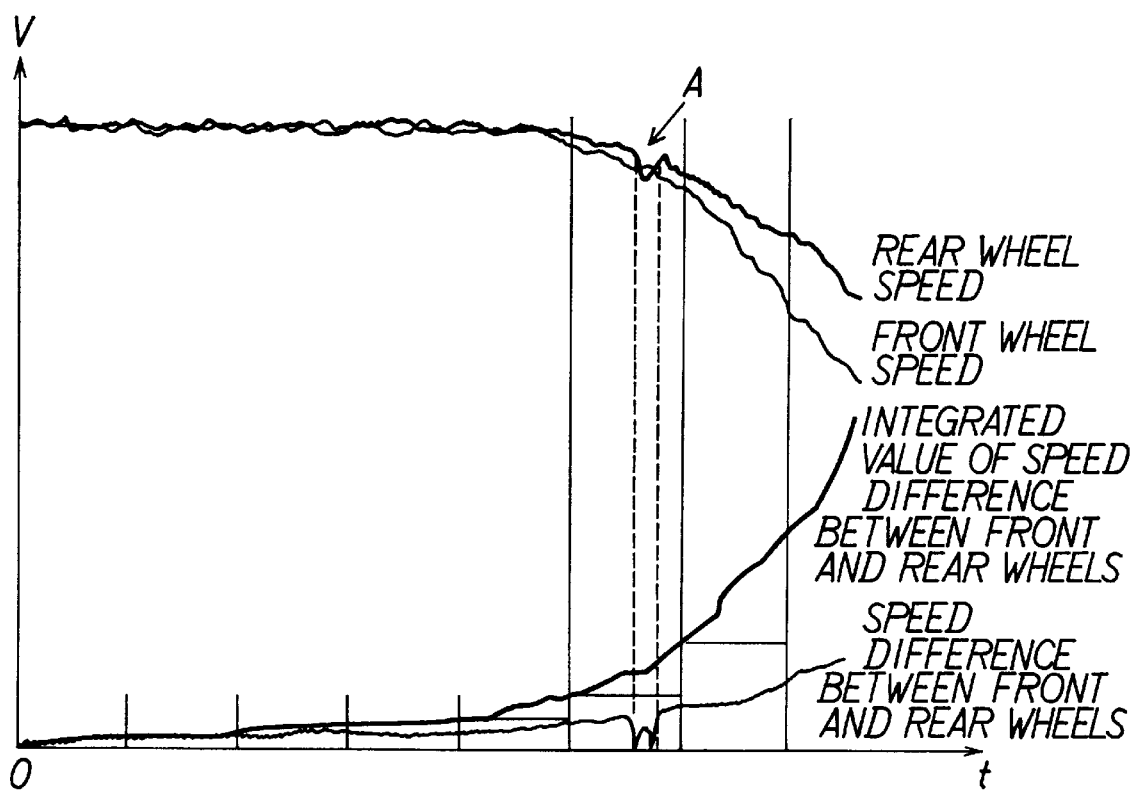
FIG. 5 is a graph showing integrated values obtained by integrating wheel speed differences between front and rear wheels in a vehicle.

In step 15, an integrating calculation for periodically and sequentially integrating the front and rear wheel speed differences obtained in step 14 is carried out. Here, as shown in FIG. 5, absolute values of the front and rear wheel speed differences are integrated. By means of the integrating calculation, effects of noise components in the speeds of the front and rear wheels can be reduced. For example, as shown at a point A in FIG. 5, if the rear wheel speed drops due to noises when front wheel speed is dropping faster than rear wheel speed, a speed difference between the front and rear wheels is restored to normal and thus, it may be mistakenly determined that dropping in the speed is solved. However, by periodically and sequentially integrating front and rear wheel speed differences, effects of noise error components can be reduced, making it possible to continuously monitor differences in front and rear wheel speed.

In step 16, it is determined whether an integrated value calculated in step 15 is above or below a specified value within an integrating period. That is, the routine determines whether the apparent speed difference between the front and rear wheels is really occurring or not within this integrating period. Here, if the integrated value exceeds the specified value, and thus a speed difference between the front and rear wheels exists, then processing moves to step 17. If it is determined that the integrated value is below the specified value, and thus the front and rear wheel speeds are the same, processing moves to step 30.

In step 17, it is determined whether it is time to calculate, in step 18, an average changing ratio of integrated wheel speed differences. Specifically, whether a preset specified period passes or not is determined. The specified period is set longer than a period in which the integration of wheel speed differences is carried out in step 15. In step 17, when it is determined that the specified period of time has passed, processing moves to step 18. If it is determined that the specified period of time has not yet passed, processing moves to step 22, and conventional processing to determine starting of ABS control is carried out without estimating the road surface friction coefficient.

Alternatively, it may be possible to employ a method which determines whether the integrated value of speed differences between the front and rear wheels exceeds the specified amount regardless of passage of time after a previous calculation.

In step 18, the routine calculates an average changing ratio within a specified period of time with respect to the integrated values calculated in step 15. For example, integral calculation is performed at every 5 ms and calculation of a changing ratio of the integrated value is performed at every 50 ms. If the average changing ratio is calculated by using a time shorter or the same as a period in which wheel speed differences are integrated, the average changing ratio will be a speed difference between the front and rear wheels.

Figure 6:
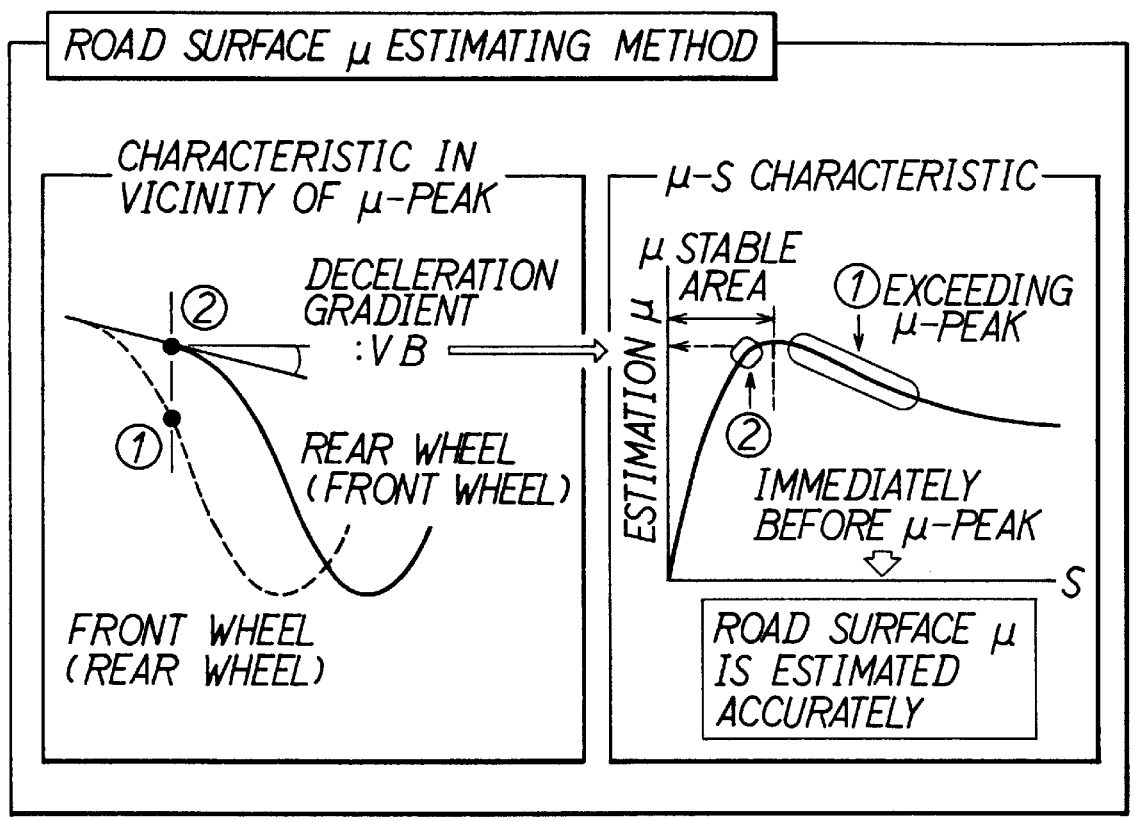
FIG. 6 is a view illustrating a concept of the invention for estimating a road surface friction coefficient.

In step 19, the routine determines whether to estimate a road surface friction coefficient prior to starting ABS control depending on the size of the average changing ratio calculated in step 18. If the average changing ratio is below a preset specified value, as shown in FIG. 6, speed reductions of the front and rear wheels are in a stable area prior to a μ–peak in which frictional coupling between a road surface and a tire is largest. Since a road surface friction coefficient can be accurately estimated in this case, processing moves to step 20. On the other hand, if the average changing ratio exceeds the specified value, the speed reduction of the front wheels (or the rear wheels) is suddenly increased and the front and rear wheels are in an unstable area exceeding the μ–peak in which friction coupling between the road surface and the tire is largest. When accurate estimation of the road surface friction coefficient is impossible, processing moves to step 22 so that the starting of the ABS control is determined. In step 22, the road surface friction coefficient calculated previously in step 20 corresponds to a friction coefficient immediately before the μ–peak between the wheel and the road surface.

In step 20, if the changing ratio is below the specified value in step 19, estimating a road surface friction coefficient can be accurately performed and calculation is performed to estimate the road surface friction coefficient. As a method of calculating an estimated road surface friction coefficient, as described above, in the front and rear wheels with reduced wheel speeds, an average changing gradient of a wheel speed of the wheel in which the change is smallest is employed. That is, in step 20, an average deceleration gradient is used to estimate a road surface friction coefficient.

Within the preset specified period of time used in steps 17 and 18, the average deceleration gradient is calculated for the wheel speed of the front or rear wheels which experience the smallest speed change. Specifically, within the specified period of time, by using the period in which the difference in wheel speeds is calculated in step 14, the wheel speed of either the front or rear wheels in which the speed change is smallest in the period is picked up. Then, a linear equation approximately passing the picked up point is calculated and an inclination of the equation is used as the average deceleration gradient.

For example, high vehicle body deceleration occurs on a dried road surface when the braking force is applied to the wheels. In this case, due to the vehicle body deceleration, load movement to the front wheels may increase and speeds of the rear wheels may drop faster than the front wheels. In this case, the front wheel speeds, in which speed dropping is smallest because of load movement of the vehicle body and high friction coupling between the road surface and the wheels, correspond to the wheel speed of the wheels in which speed change is smallest in the above-described period. Thus, the average deceleration gradient is calculated by using the front wheel speed. It may be possible simply to employ as the average deceleration gradient a value obtained by dividing a difference between a speed at the specified passage of time after the wheel speed is calculated in step 13 and a speed at the specified passage of time after a current wheel speed is calculated by a specified period of time.

Next, explanation will be made of a way of estimating road surface friction coefficients. Road surface friction coefficients can be estimated by using a graph showing a characteristic in the vicinity of the $\mu$ peak and a $\mu$–s characteristics graph in FIG. 6. More specifically, the moment that the speed difference between the front and rear wheels suddenly increases, that is, immediately before a changing ratio of the integrated front-rear speed difference exceeds the specified value, the wheel in which speed drops faster than the other exceeds the $\mu$–peak. On the other hand, the remaining wheels are in an area immediately before the $\mu$–peak. Thus, a deceleration gradient of the remaining wheel, that is, one in which a change in a wheel speed is smaller corresponds to vehicle body deceleration VB.

A method of estimating road surface friction coefficients is expressed by an equation 2 using a road surface friction coefficient $\mu$ and vehicle body deceleration VB.

$$\mu F^* WF + \mu R^* WR = -(VB/g)^* WB \quad \text{(Equation 2)}$$

$$\mu(WF+WR) = -(VB/g)^* WB \quad \text{(Equation 3)}$$

Herein, $\mu$F: front wheel road surface friction coefficient

WF: front wheel load $\mu$R: rear wheel road surface friction coefficient

WR: rear wheel load

VB: vehicle body deceleration

WB: vehicle weight g: gravitational acceleration

Generally values $\mu$ of the front and rear wheels are equal ($\mu F = \mu R = \mu$), and thus equation 2 is expressed by equation 3, and a relationship of road surface friction coefficient $\mu\infty$ vehicle body deceleration VB is established resulting in road surface friction coefficient≈vehicle body deceleration. In this way, road surface friction coefficients can be accurately estimated.

Next, explanation will be made of a case where in step 16, it is determined that the integrated value is within a specified range in the integration period, that is, the front and rear wheels keep the same speed.

In this case, the speeds of all the four wheels drop when the vehicle is moving at a constant speed or a braking force is applied. Speed dropping of the four wheels when a brake is applied on the vehicle is practically inconceivable on a high $\mu$ road in which friction coupling between the wheel and the road surface is strong and wheel speed dropping is slow because of the load movement. However, on a low $\mu$ road, speeds of the four wheels may simultaneously drop because the friction coupling between the wheel and the road surface is weak. In other words, as shown in steps 30 and 31, a low $\mu$ road is determined when almost no differences in speeds between the front and rear wheels are found for over a specified period of time in a state where a braking force is applied to the vehicle.

This means that in step 30, it is determined whether an integrated value of speed differences between the front and rear wheels exceeds a preset specified value. That is, it is determined whether a state in which differences in speeds between the front and rear wheels do not occur is continued for a specified period of time. When it is determined that the integrated value does not exceed a specified value within a specified period of time, processing moves to step 31, and when the determination is otherwise, processing moves to step 22.

In step 31, an average speed gradient of wheel speeds within a specified period of time is determined. That is, whether a wheel speed really drops or not is determined, and when the average speed gradient over a specified value is detected, it is determined that a braking force has been applied to the vehicle. Here, when the average speed gradient is determined to be over the specified value, processing moves to step 32, and when the gradient is below the specified value, processing moves to step 22 since the low gradient is considered not to indicate a low friction coefficient road surface.

In step 32, where there have been almost no differences in speeds between the front and rear wheels for over the specified period while the speeds of all the wheels drop, the present road surface is determined to be a low friction coefficient road surface. Then, the information is sent to step 21 as information of ABS control reference.

In step 21, by means of the road surface friction coefficient estimated in step 20, various ABS control references (deceleration gradient of the estimated vehicle body speed, control start slipping reference value of each wheel, pressure decrease and increase after starting of ABS control, etc.) are switched from a state prior to ABS control.

In step 22, whether or not to start ABS control is determined, considering various ABS control references that have been switched in step 21.

In step 23, solenoid driving is executed in accordance with a determined result of starting ABS control in step 22.

Therefore, by estimating the road surface friction coefficient before starting ABS control, control according to the road surface friction coefficient which is conventionally impossible, can be properly executed from an initial cycle of starting ABS control. Moreover, it is possible to prevent, in advance, situations where a vehicle body becomes extremely unstable because of nonstarting of ABS control.

Figure 7:
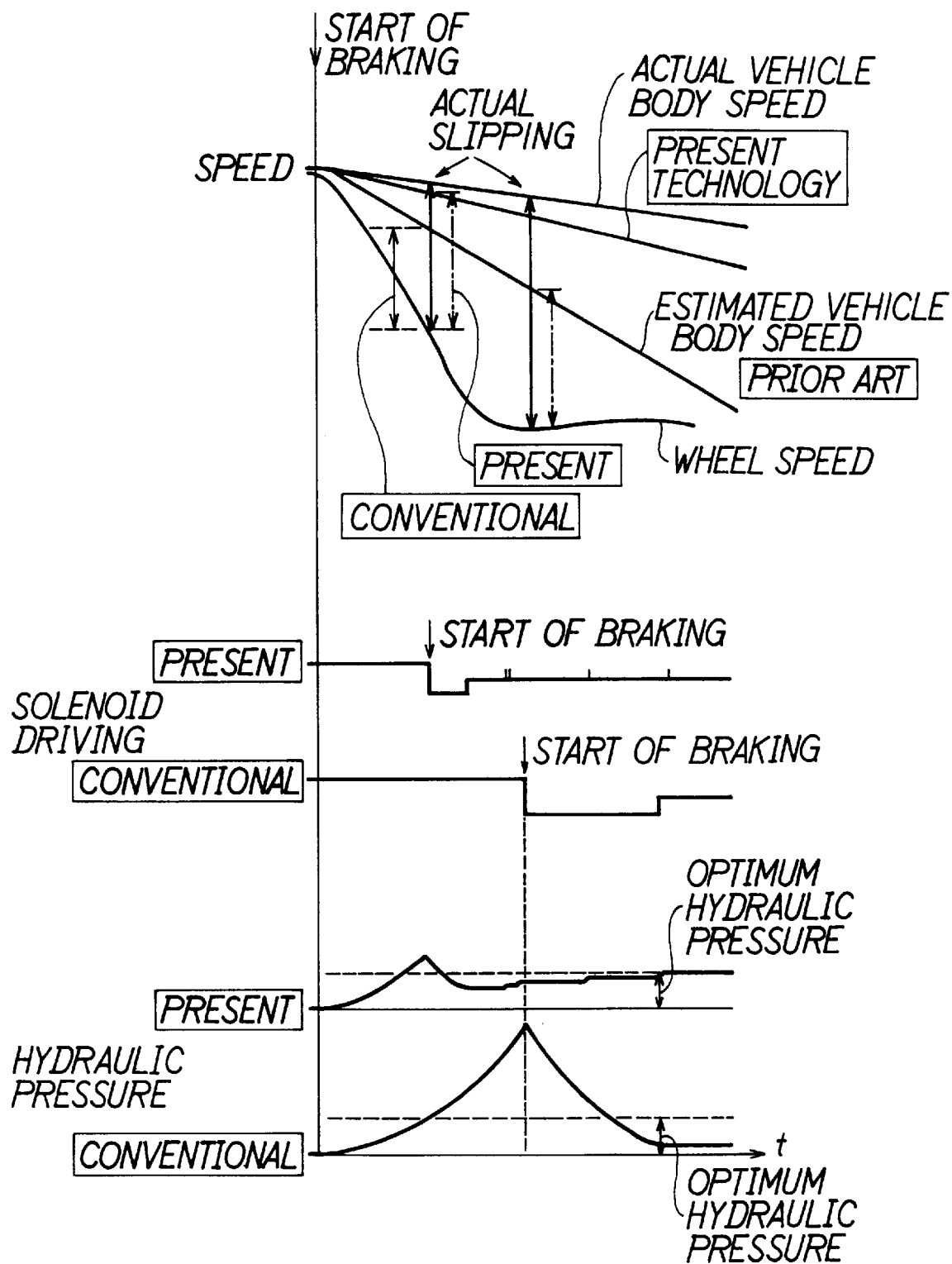
FIG. 7 is a timing chart showing an operational state of ABS control in the first embodiment.

Conventionally, for instance, as shown in FIG. 7, since an estimated vehicle body speed far different from the real vehicle body speed is used, control reference is largely different from real situations of the wheels and the road surface, and therefore, the time for staring ABS control is unstable. This will be explained based on the following equation for generally estimating the vehicle body speed:

$$VSB(n) = MED(Vw0, VSB(n-1) - \alpha down^* t, VSB(n-1) - \alpha up^* t) \quad \text{(Equation 4)}$$

VSB: estimated vehicle body speed

MED: intermediate value employed

Vw0: selected wheel speed

αdown: wheel deceleration upper limit constant
αup: wheel acceleration upper limit constant
t: calculation period
n: number of calculating times By employing equation 4, in step 22, an estimated vehicle body speed is calculated as a reference for determining a starting time for ABS control. If, in this case, a wheel acceleration upper limit constant αup and a wheel deceleration upper limit constant αdown are preset specified values, an estimated vehicle body speed is determined without consideration given to a friction coefficient of the road surface. However, by means of a technique devised by the present invention, the friction coefficient of the road surface can be estimated beforehand, so that vehicle body speed can be estimated closer to actual vehicle body speed based on the road surface friction coefficient. By calculating the estimated road surface friction coefficient and changing settings of the wheel acceleration upper limit αup and the wheel deceleration upper limit αdown, the vehicle body speed can be more accurately estimated. Friction coupling between the wheel and the road surface, that is, slipping between the wheel and the road surface, can also be accurately grasped. Therefore, ABS control is started in an optimum slipping situation of the wheel, and stable movement of the vehicle can be achieved.

The first embodiment can be modified as follows:

In step 20 in the flow chart in FIG. 2, the road surface friction coefficient is estimated by using the speed of a wheel of the front and rear wheels in which the speed change is smallest. However, a vehicle body speed of the vehicle from each wheel speed may be calculated by using the equation 4 and a road surface friction coefficient can be estimated from an average deceleration gradient of the vehicle body speed within a specified period of time. That is, in step 14, a difference between the vehicle body speed and the speed of the front wheels and the difference between the vehicle body speed and the speed of the rear wheels are calculated. In step 15, absolute values of differences between (1) differences between the vehicle body speed and the speed of the front wheels and (2) differences between the vehicle body speed and the speed of the rear wheels are obtained, and the absolute values are periodically and sequentially integrated for a specified period of time. By using the integrated values, it is determined whether calculating a changing ratio of integrated values and estimating a road surface friction coefficient in steps 18 and 19 should be carried out. In step 20, if it is determined that a road surface friction coefficient can be accurately estimated in step 19, the road surface friction coefficient is estimated. In this case, the average deceleration gradient of a vehicle body speed within the specified period of time corresponds to a vehicle body speed deceleration VB in the equation 2. Thus, based on a relationship of a road surface friction coefficient $\mu$ VB, a road surface friction coefficient can be accurately estimated by means of the average changing deceleration gradient of the vehicle body speed within the specified period of time. A speed of the vehicle is always a value in line with reality by correcting the wheel deceleration lower limit constant number αdown and a wheel acceleration upper limit αup in the equation 4 each time when a road surface friction coefficient is estimated.

In step 18 in the flow chart in FIG. 2, the average changing ratio within the specified period of time of the integrated values of speed differences between the front and rear wheels is calculated. However, it may be possible to employ a method wherein a time is obtained each time an integrated value of wheel speed differences between the front and rear wheels reaches a preset specified amount and an average deceleration gradient during this period is used as a changing ratio.

Furthermore, in step 20 in the flow chart in FIG. 2, the amount of load movement to the front wheels increases and the speed of the rear wheels drops earlier than that of the front wheels on a dried road in which high vehicle body deceleration occurs. In this case, with respect to the load movement amount, corrected loads of the front and rear wheels WF' and WR' for the wheel load W in the equation 1 for estimating speed reduction of each wheel may be used. A load movement amount ΔW by vehicle body deceleration is obtained by an equation 5 and loads of the front and rear wheels WF' and WR' when a brake is applied are obtained by equations 6 and 7.

$$\Delta W = \{WB^*(H/L)^*(-VB)\}/g \quad \text{(Equation 5)}$$

$$WF' = WF0 + \Delta W \quad \text{(Equation 6)}$$

$$WR' = WR0 - \Delta W \quad \text{(Equation 7)}$$

ΔW: vehicle load movement amount
H: height of center of gravity
L: wheel base
WF0: front wheel static load
WR0: rear wheel static load From the above equations 5 to 7, the load movement amount when the brake is applied depends on a vehicle body deceleration VB. Therefore, the real speed dropping state of the wheel when the brake is applied is determined by a balance between the braking force and the vehicle body speed (load movement amount) produced by braking.

Next, a second embodiment of the invention will be explained.

In the above-described first embodiment, an antiskid controller is described in which deceleration of the vehicle at a point in which the speed difference between the front and rear wheels when the brake is applied suddenly increases is used as estimated $\mu$ of a road surface, and brake pressure control is started and control thereafter is executed according to the road surface $\mu$. Thus, for instance, even in a four-wheel-drive vehicle, ABS control without using a G sensor can be achieved.

However, the technique of the first embodiment is for estimating the road surface $\mu$ from a changing speed difference between the front and rear wheels when a brake is applied to the vehicle. Therefore, the road surface $\mu$ cannot be estimated extremely accurately when the vehicle is in a turning state in which a speed difference is not generated by braking or when a road surface situation is bad.

It is unlikely that a speed difference between the is front and rear wheels occurs when applying a soft brake on a road surface such as on an icy road in which a road surface $\mu$ is extremely low. When the integrated value of speed differences between the front and rear wheels within the specified period of time does not exceed the specified value, it is simply determined as a low road surface $\mu$.

Furthermore, while braking on a changing road surface (changing from a dried road to a compressed-snow road) correcting the estimated road surface $\mu$ (part of a compressed-snow road is icy, etc.) may be necessary.

Therefore, the second embodiment provides an antiskid controller with higher performance in which a road surface $\mu$ can be properly corrected according to changes in vehicle travelling conditions such as turning, road surface changing and the like and antiskid control adapted to the road surface can be performed based on the estimated and corrected road surface $\mu$. The structure of the hydraulic circuit in the antiskid controller in the second embodiment will not be explained here, because it is the same as the circuit in FIG. 1. The structure of the hydraulic circuit in the second embodiment is not limited to the one in FIG. 1 but other antiskid controller hydraulic circuits may be applied.

Next, ABS control executed in the second embodiment thus structured will be described with reference to FIGS. 8 to 23.

Figure 8B:
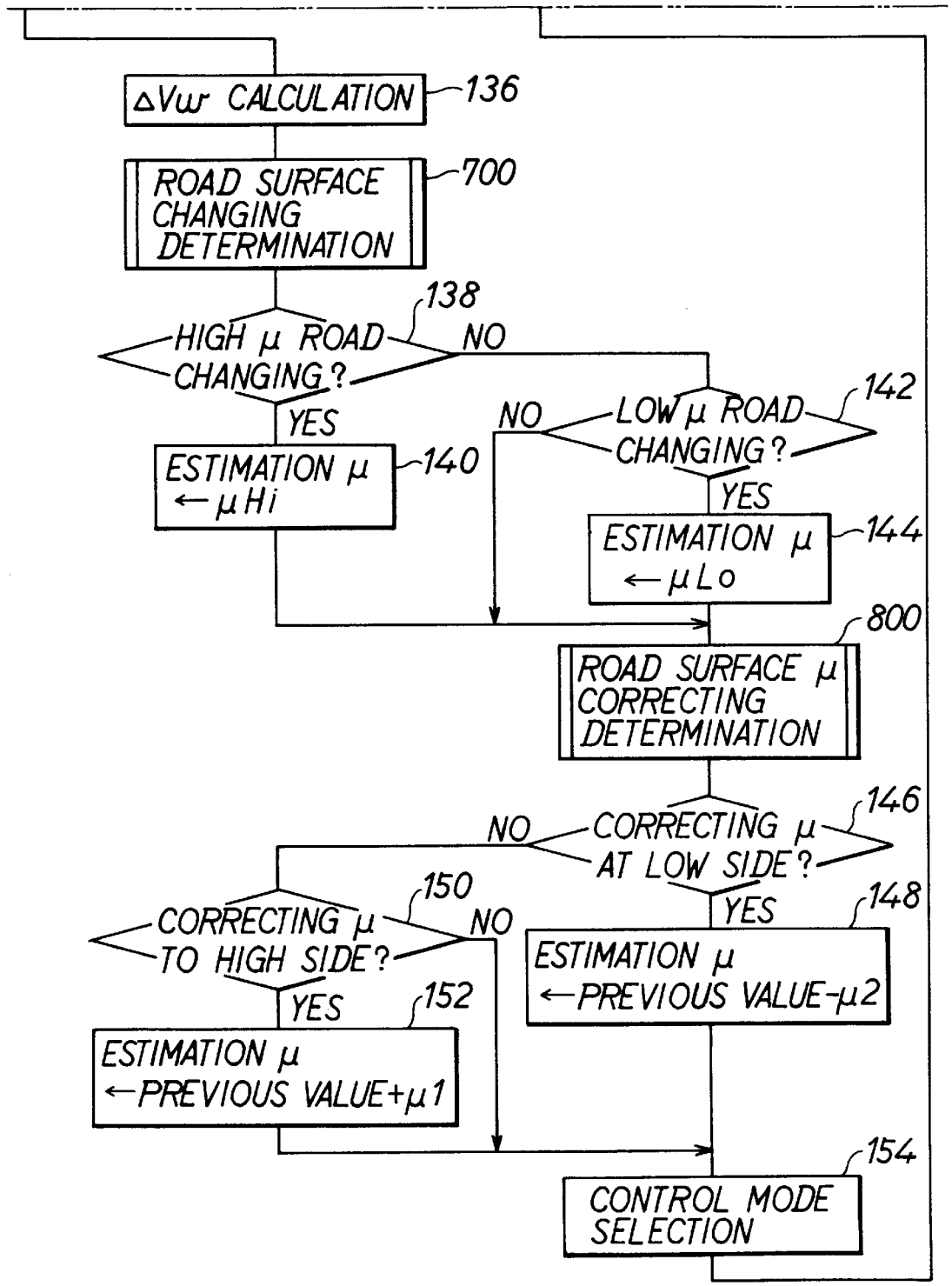
FIG. 8 is a flow chart showing a main routine in a second preferred embodiment.

FIG. 8 is a flow chart showing a main routine of an ABS controller. When an ignition switch (not shown) is switched ON, processing is started from step 100.

After processing starts, first, initial setting of various flags and counters is performed in step 101. In the following step 102, wheel speed signals of wheel speed sensors 71 to 74 are input to a central arithmetic processing unit ECU 100. In step 104, based on signals input from the wheel speed sensors 71 to 74, a wheel speed Vw and wheel acceleration Gw of a wheel to be controlled (any one of FL to RR) are calculated. Then, in step 106, based on each wheel speed Vw obtained in step 104, an estimated vehicle body speed Vb is calculated.

With a largest speed Vwmax of wheel speeds VWFL to VwRR as a reference speed, determination is made on whether the largest speed Vwmax is within a range from a speed obtained by subtracting a deceleration limit Vdown obtained by a function f1($\mu$) of an estimated road surface friction coefficient $\mu$ (hereinafter road surface $\mu$) from a previously calculated estimated vehicle body speed Vb(n−1) to a speed obtained by adding acceleration limit Vup obtained by a function f2($\mu$) to Vb(n−1) (i.e., is Vb(n−1)−Vdown<Vwmax<Vb(n−1)−Vup?). If the largest speed Vwmax is found to be within the range from the speed of adding the acceleration limit Vup to one of subtracting the deceleration limit Vdown, the largest speed Vwmax is set as an estimated vehicle body speed Vb. If the largest speed Vwmax exceeds the speed of adding the acceleration limit Vup, the speed of adding the acceleration limit Vup is set as an estimated vehicle body speed Vb. Finally, if the largest speed Vwmax is below the speed of subtracting the deceleration limit Vdown, the speed of subtracting the deceleration limit Vdown is set as the estimated vehicle body speed.

As for the reference speed, other than the largest speed Vwmax an intermediate value obtained by adding a weight to each wheel speed Vw may be used.

In step 106, together with calculation of an estimated vehicle body speed Vb, an estimated vehicle body deceleration Gb is calculated. For calculating the estimated vehicle body deceleration Gb, a method of calculating a changing gradient of an estimated vehicle body speed Vb per unit time can be used.

In step 108, the routine determines whether ABS control is currently being executed or not. In step 110 and thereafter, a road surface $\mu$ is estimated before ABS control is started. On the other hand, during ABS control, switching and correcting of an estimated road surface $\mu$ are executed in step 136 and thereafter. First, a processing prior to starting ABS control will be explained.

In step 110, a speed difference ΔVx between the front and rear wheels is calculated. For this calculation of a front and rear wheel speed difference, a method of independently calculating differences on a left side and a right side, specifically between FL wheel—RL wheel and between FR wheel—RR wheel are used. Also, a method of calculating an average value, such as (FL wheel+FR wheel)/2−(RL wheel+RR wheel)/2 and the like may be used.

Likewise, in step 112, a speed difference ΔVy between left and right wheels is calculated. For this calculation of a left and right wheel speed difference, a method of independently calculating differences on a front side and a rear side, specifically FL wheel—FR wheel and RL wheel—RR wheel, is used. Also, as in the case of the above-described front and rear wheel speed difference, a method of calculating an average value such as (FL wheel+RL wheel)/2−(FR wheel+RR wheel)/2 and the like may be used.

Next, by means of forward and backward G estimating means, deceleration in forward and backward directions of the vehicle, corresponding to the largest road surface $\mu$ ($\mu$peak) is estimated (step 200). By means of vehicle turning determining means whether the vehicle is in a turning state or not is determined (step 300). The forward and backward G estimating means in step 200 and the vehicle turning determination in step 300 will be described in detail later.

In step 114, based on a result of determining the turning state of the vehicle in step 300, how to set acceleration in a lateral direction of the vehicle (lateral G) is determined. That is, when the vehicle is found to be moving straight, lateral G is determined to be zero in step 11 and processing moves to step 118. On the other hand, when the vehicle is found not to be moving straight, lateral G of the vehicle is estimated by means of lateral G estimating means and processing moves to step 118 (step 400). The lateral G estimating means in step 400 will be described in detail later.

In step 118, a value obtained by synthesizing a forward and backward G estimated value calculated in step 200 and a lateral G estimated value set in step 400 or in step 116 is calculated. The value obtained by synthesizing the forward and backward G estimated value and the lateral G estimated value is used as a road surface $\mu$ estimated value.

Next, by means of bad road state determining means, whether a currently travelling road surface is bad or not is determined (step 500). The bad road state determining means in step 500 will be described in detail later.

In step 120, depending on a result of determining the bad road state in step 500, whether or not to switch a road surface $\mu$ estimated value is determined. In the case of a bad road state, processing moves to step 122 and the road surface $\mu$ estimated value is changed to a bad road $\mu$ value $\mu$bad. The bad road $\mu$ value $\mu$bad is a settable maximum value in order to apply a sufficient brake to the vehicle.

If a bad road is not determined in step 120, no change is made to the estimated road surface $\mu$ value and processing moves to step 600. In step 600, by means of icy road determining means, whether the vehicle is currently travelling on an icy road or not is determined. If the vehicle is found to be travelling on an icy road, processing moves to step 126 and the road surface $\mu$ estimated value is changed to an icy road $\mu$ value $\mu$ice. Here, the icy road $\mu$ value $\mu$ice must be set small to secure sufficient stability of the vehicle on the icy road on which the vehicle is found to be travelling in step 600.

In step 124, if the vehicle is found not to be travelling on an icy road, no change is made to the road surface $\mu$ estimated value and processing moves to step 128. When processing reaches step 128, a road surface $\mu$ estimated value before starting ABS control has been established for the first time. In step 128, whether a timing for starting ABS control exists or not is determined. Conditions for starting ABS control are that, for instance, a stop switch 10 is ON, a wheel speed Vw is smaller than an estimated vehicle body speed Vb by a specified speed and wheel acceleration Gw is smaller than a preset reference deceleration. Then, processing moves to step 130 and these will be described later.

When ABS control is determined to be in operation in step 108, processing moves to step 136 and a speed difference ΔVw between an estimated vehicle body speed Vb and each wheel speed Vw is calculated. By means of calculating a speed difference between the estimated vehicle body speed Vb and the wheel speed Vw, a slipping state of the vehicle can be grasped.

Next, by means of changing road surface determining means, road surface changing during ABS control is determined (step 700). The determination of changing road surface in step 700 will be described in detail later.

In step 138, if the road surface is determined to be changing to a high μ by changing means in step 700, processing moves to step 140, a road surface μ estimated value is changed to a high μ value μHi and processing moves to step 800. Here, the high μ value μHi is set at a relatively high value so as to secure at least a sufficient brake applied to the vehicle.

If the road surface is found not to be changing to the high μ road in step 138, processing moves to step 142 and whether changing of the road to a low μ road has been determined or not is determined in step 700. If changing of the road to a low μ is determined, processing moves to step 144, a road surface μ estimated value is changed to low μ value μLo and processing moves to step 800. Here, the low μ value μLo is set at a relatively small value so as to secure at least sufficient stability of the vehicle during control on a low μ.

If changing of the road to the low μ road is not determined in step 142, changing of a road surface μ estimated value is not made and processing moves to step 800. In step 800, by road surface μ correction determining means, whether the road surface μ estimated value is changed to a low side or a high side is determined. The road surface μ correction determining processing in step 800 will be described in detail later.

In step 146, whether correction of the road surface μ to the low side is determined or not is determined in step 800, and if the correction to a low side is determined, processing moves to step 148, the road surface μ estimated value is lowered by a correction amount μ2 and processing moves to step 154. The lowering correction value μ2 in step 148 is set so as to enable the determining of the lowering correction of the road surface μ in step 800.

If correction of the road surface to the low side is not determined in step 146, processing moves to step 150 and whether correction of the road surface μ to a high side has been determined or not is determined in step 800. If the correction to a high side is determined, processing moves to step 152, the road surface μ estimated value is increased by a correction amount μ1 and processing moves to step 154. The increased correction value μ1 in step 152 is set to enable the determining of the increasing correction of the road surface μ in step 800.

If correction of the road surface μ to a high side is not determined in step 150, correction of the road surface μ estimated value is not executed and processing moves directly to step 154. When processing reaches the step 154, an estimated road surface μ for ABS control is established for the first time.

In step 154, based on each wheel speed Vw and each wheel acceleration Gw, whether to increase, hold, or decrease brake hydraulic pressure for each wheel is determined. After a control mode is selected in step 154, processing moves to step 130.

Processing in step 130 is a step executed both prior to starting ABS control and during control. In step 130, a deceleration limit Vdown utilized for calculation of an estimated vehicle body speed Vb (step 106) is obtained according to a function f1(μ) of the estimated road surface μ. Similarly, in step 132, an acceleration limit Vup is obtained according to a function f2(μ) of the estimated road surface μ. Lastly, in step 134 solenoid driving is executed according to the result of determining ABS control start in step 128 or the control mode selected during ABS control in step 154, and processing moves to step 102 again.

Next, main processing in the flow chart in FIG. 8 is explained.

Figure 9:
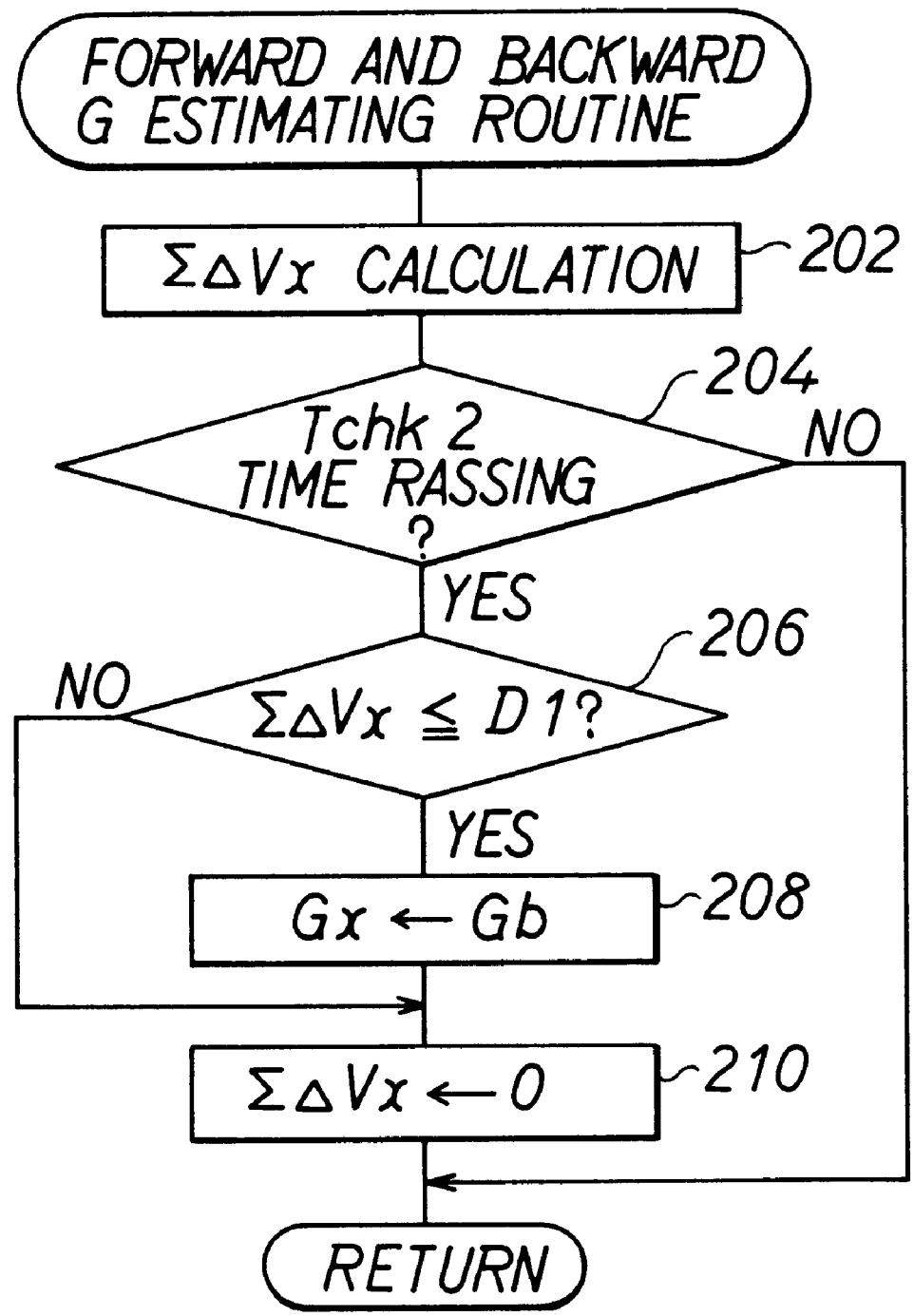
FIG. 9 is a flow chart showing an example of forward and backward G estimating means in the second embodiment.

Processing contents of the forward and backward G estimating means are shown in FIG. 9. In FIG. 9, in step 202, integral calculation of speed differences ΔVx between the front and rear wheels calculated in step 110 is executed, and in step 204, the integral calculation is continued until the time Tchk2, being a time for calculating forward and backward G, is passed. If passing of the time Tchk2 is determined in step 204, processing moves to step 206 where it is determined whether the integrated value ΣΔVx is over a value D1. If the integrated value ΣΔVx is below D1, the speed difference between the front and rear wheels at the time of application of the brake has not increased suddenly. Processing then moves to step 208 and a vehicle body deceleration (forward and backward G) Gx is used as a value of estimated vehicle body deceleration Gb calculated in step 106. Then, moving to step 210, the integrated value ΣΔVx is cleared to 0 and processing moves back to the main routine.

On the other hand, if the integrated value ΣΔVx is over the value D1, the speed difference between the front and rear wheels is greater. Therefore, vehicle body forward and backward G is established and the vehicle body deceleration Gx is not renewed, moving to step 210 to execute similar processing.

Figure 16:
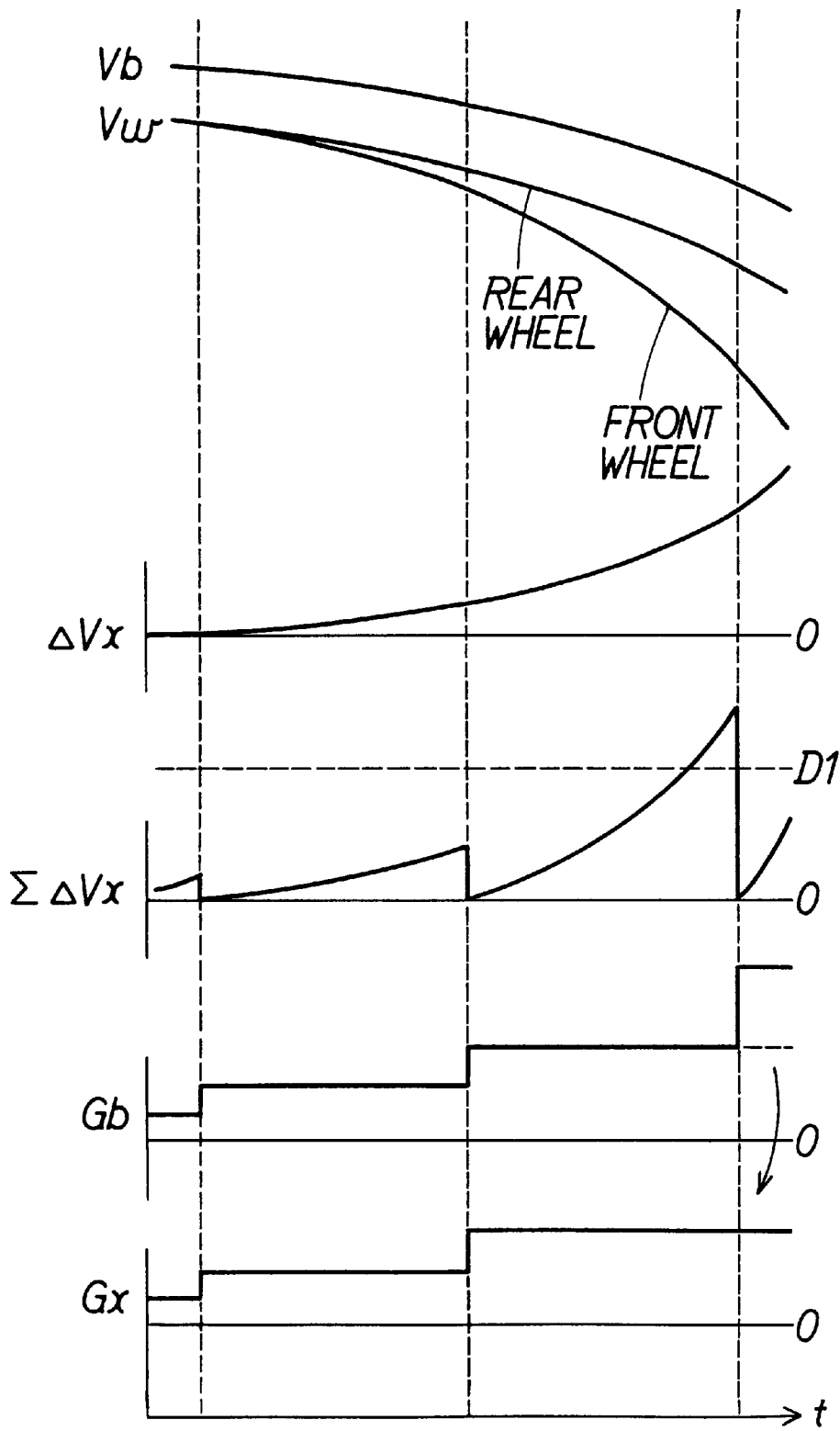
FIG. 16 is a time chart at a time of executing forward and backward G estimation processing in FIG. 10.

A series of operations of the forward and backward G estimation means are shown in FIG. 16. That is, the integrated value ΣΔVx is calculated every determining time Tchk 2 and it is determined whether the integrated value ΣΔVx is above a value D1. If the value is below D1, vehicle body deceleration Gx is a value of estimated vehicle body deceleration Gb. On the other hand, if the value is above D1, a previous value is maintained without renewing vehicle body deceleration Gx, and thus, estimation of vehicle body forward and backward G at the time of applying a brake to the vehicle can be accurately carried out.

That is, in the vehicle, to maintain the stability of the vehicle during braking, a slight difference in braking torque is applied to the front and rear wheels at the time of braking to prevent the rear wheels from reaching the locking state earlier than the front. Thus, a difference in timing between the front and rear wheels for sudden reduction in wheel speeds after exceeding the μ peak in the μ–s characteristic is produced. However, since the time difference is produced when a difference in braking torque given to the front and rear wheels is small, the other wheels are controlled almost in the vicinity of the μ peak. Therefore, by taking the time for sudden increase of the front and rear wheel speed difference ΔVx and detecting wheel deceleration on a high speed side (close to vehicle body deceleration) at this time, deceleration corresponding to the μ peak on the road surface can be obtained because of correlation between the road surface μ and vehicle body deceleration.

In the flow chart in FIG. 9, by comparing an integrated value ΣΔVx of front and rear wheel speed differences ΔVx and the determining value D1, sudden increase of the speed difference ΔVx between the front and rear wheels is detected. Sudden reduction in speeds of the other wheels against that of one wheel can be detected by means of, for instance, a difference in deceleration between the front and rear wheels.

Figure 10:
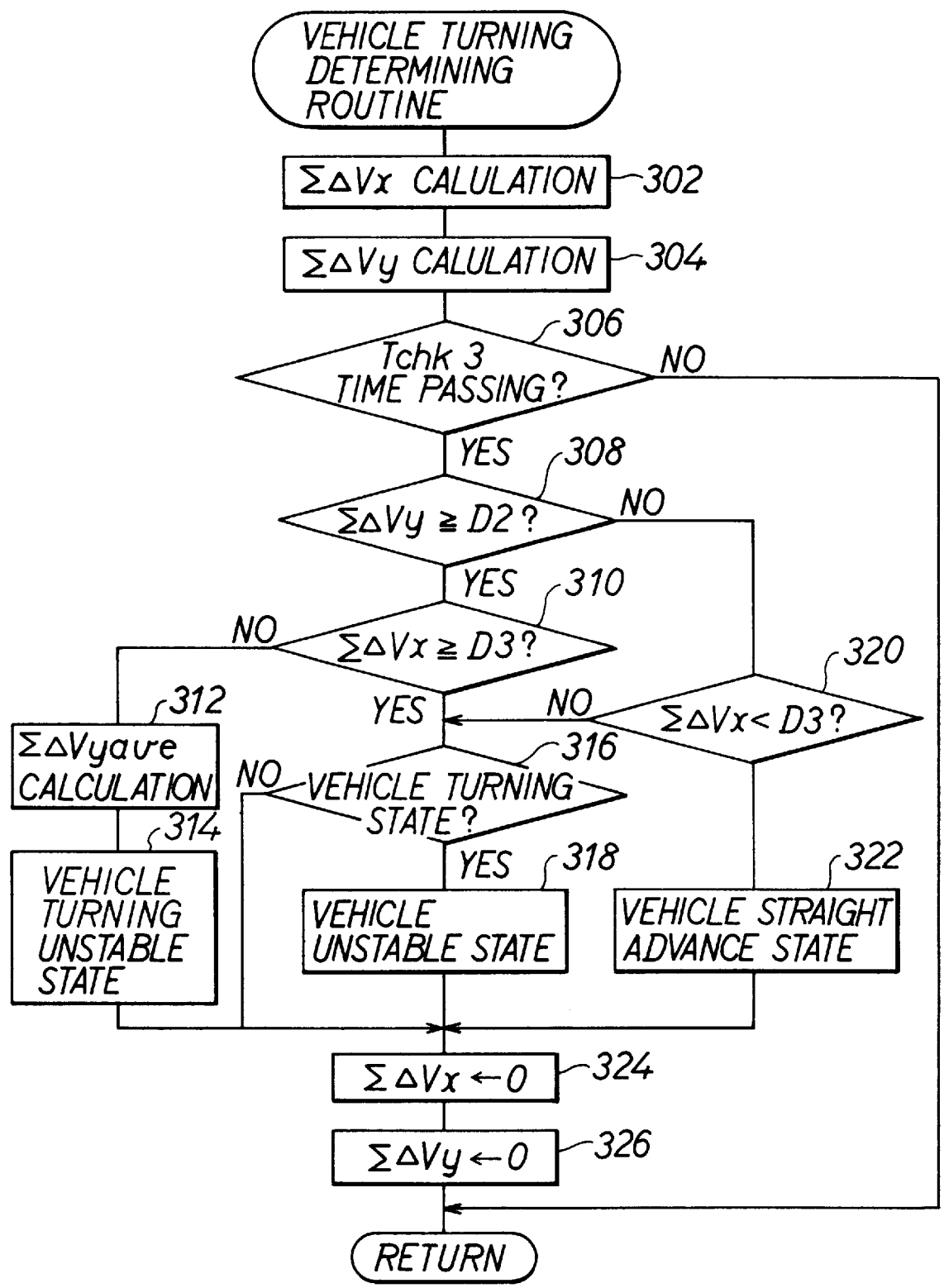
FIG. 10 is a flow chart showing an example of vehicle turning determining means in the second embodiment.

Processing contents of determining the vehicle turning state (step 300) are shown in FIG. 10. In FIG. 10, step 302 executes integral calculation of front and rear wheel speed differences ΔVx calculated in step 110. Step 304 performs integral calculation of left and right wheel speed differences ΔVy calculated in step 112, and in step 306, the above-described integral calculation is continued until the timing Tchk3 for calculating lateral G is passed.

If passing of Tchk3 is determined in step 306, processing moves to step 308 to determine whether an integrated value ΣΔVy of left and right wheel speed differences ΔVy is above a left and right wheel speed difference determining value D2. If the integrated value ΣΔVy is above the determining value D2, a left and right wheel speed difference is detected, and processing moves to step 310 to determine whether an integrated value ΣΔVx is above a front and rear wheel speed difference determining value D3. If the integrated value ΣΔVx is below the determining value D3, that is, the left and right wheel speed difference is large and the front and rear wheel speed difference is small, it is determined that the vehicle is turning. Processing then moves to step 312 and an average value ΣΔVyave per unit time of an integrated value ΣΔVy is calculated and used for calculation of vehicle body lateral G in step 400. Step 314 determined that the vehicle is turning beforehand and processing moves to step 324. In steps 324 and 326, the integrated values ΣΔVx and ΣΔVy are cleared to zero and processing returns to the main routine. On the other hand, if the integrated value ΣΔVx is found to be over the front and rear wheel speed difference determining value D3 in step 310, that is, both left and right wheel speed difference and front and rear wheel speed difference are large, processing moves to step 316 to confirm whether the turning state of the vehicle is determined. If the vehicle is in the turning state, an unstable state of the vehicle is determined in step 318. If a big increase exists in the front and rear wheel difference when the vehicle is turning, the vehicle can be determined to be in such unstable states as drifting, spinning and the like. Then, moving to step 324 the above-described processing is executed.

On the other hand, if nonturning of the vehicle is determined in step 316, the state of the vehicle currently determined is kept, and processing moves to step 324 to execute the similar processing.

If an integrated value ΣΔVy is found to be below the left and right wheel speed difference determining value D2 in step 308, it is determined that no left and right wheel speed difference is produced. The processing moves to step 320 to determine whether the integrated value ΣΔVx is over the front and rear wheel straight advance determining value D3. If this is below D3, that is, both left and right wheel speed difference and front and rear wheel speed difference are small, processing moves to step 322 to determine whether the vehicle is in a straight advance state. On the other hand, if the integrated value of ΔVx is found to be above the determining value D3 in step 320, processing moves to step 316 and the above-described processing is executed.

Figure 17:
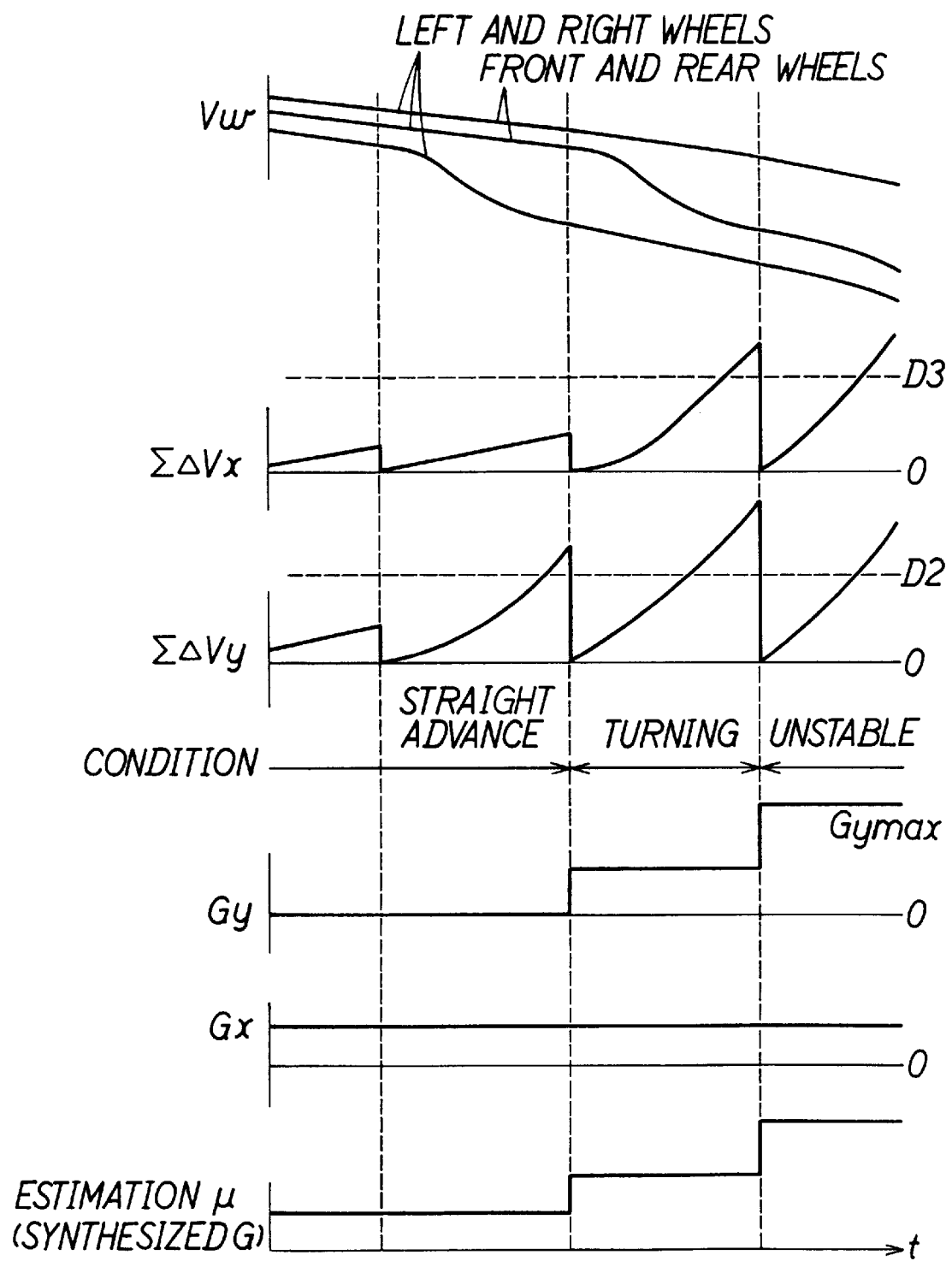
FIG. 17 is a time chart at a time of executing lateral G estimation processing based on vehicle turning determination in FIGS. 11 and 12.

A series of operations of the vehicle turning determining means are shown in FIG. 17. For each lateral G calculation timing Tchk3, the integrated value ΣΔVx and the integrated value ΣΔVy are calculated. By comparing the integrated values with the determining values D3 and D2, it is determined whether the state of the vehicle is in straight advance, turning or unstable.

More specifically, by calculating integrated values ΣΔVx and ΣΔVy within the specified period Tchk 3 with respect to front and rear wheel speed differences ΔVx and left and right wheel speed differences ΔVy, momentary effects of noise components are eliminated, accurately determining a straight advance, turning or unstable state of the vehicle. When a previous state of the vehicle is turning, an unstable state of the vehicle is determined only when a front and rear wheel speed difference ΔVx and a left and right wheel speed difference ΔVy respectively exceed the determining values. Thus, mistakenly determining that the vehicle is in the unstable state can be prevented.

Figure 11:
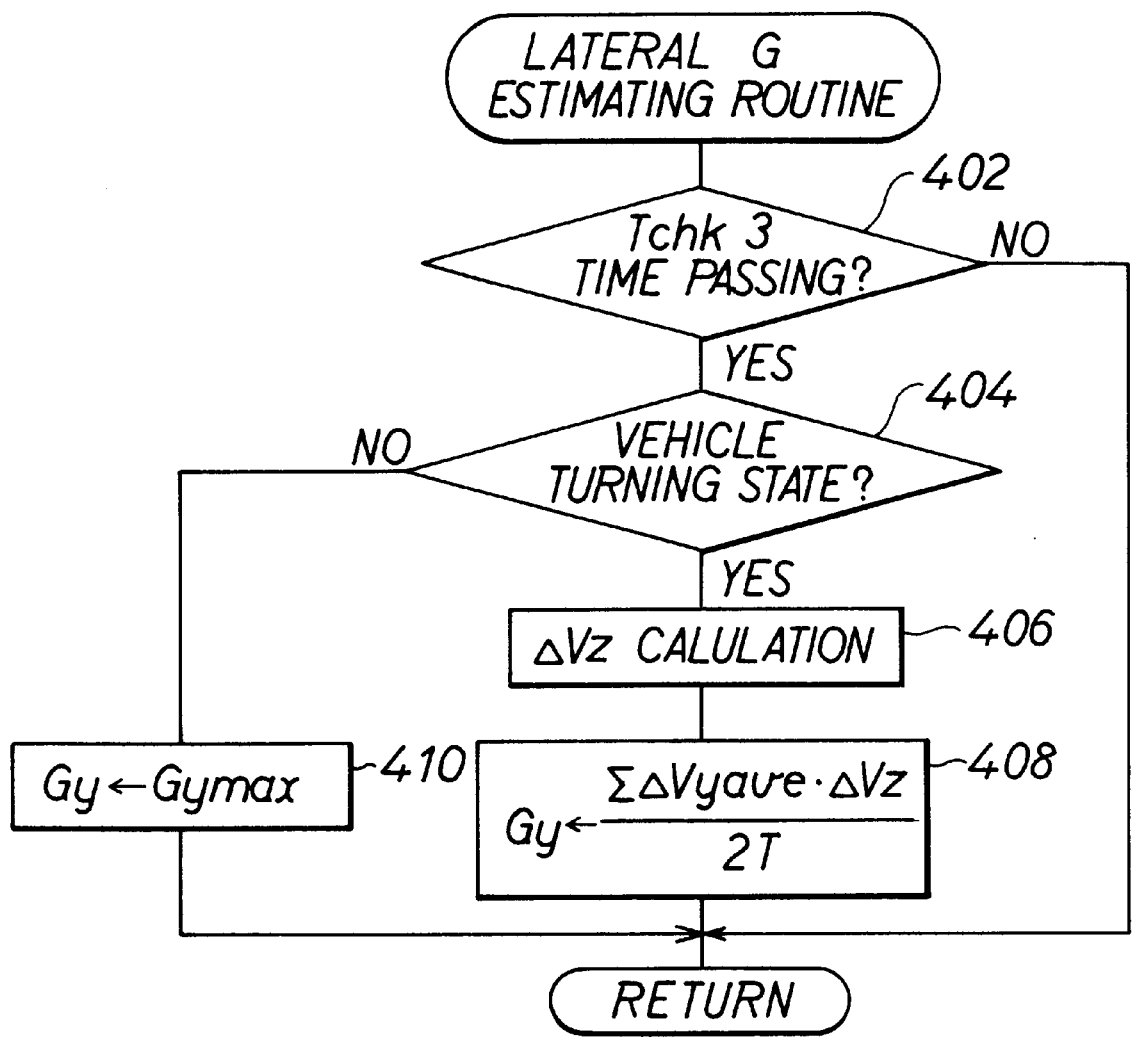
FIG. 11 is a flow chart showing an example of lateral G estimating means in the second embodiment.

Processing contents of the vehicle lateral G estimating means (step 400) are shown in FIG. 11. In FIG. 11, if it is determined that lateral G calculation timing Tchk 3 has passed in synchronization with vehicle turning determination in step 402, processing moves to step 404. Step 404 determines whether the vehicle is turning, and if it is turning, processing moves to step 406 and left and right wheel speed sum ΔVz is calculated. Then, in step 408, vehicle lateral direction acceleration (lateral G) Gy is calculated. Gy can be calculated by the following equation 8:

$$Gy = (\Sigma \Delta Vyave \cdot \Delta Vz)/2T \qquad \text{(Equation 8)}$$

Here, ΣΔVyave is an average value per unit time of integrated values ΣΔVy calculated in step 312 and T is a tread width of the vehicle. After processing is executed in step 408, processing returns to the main routine.

On the other hand, if, in step 404, the vehicle is found to be not turning but in the unstable state, moving to step 410, the largest lateral acceleration Gymax is set as the vehicle lateral Gy and processing returns to the main routine. It is preferable that as the largest possible value obtainable as a vehicle state, the largest lateral acceleration Gymax is set at one capable of applying a sufficient braking force even when the vehicle is in the drifting or the spinning state.

A series of operations of the lateral G estimating means are shown in FIG. 11, and, as shown in FIG. 17, according to determination of a state of the vehicle (straight advance, turning or unstable), the value of Gy is changed or calculated.

As described above, in the lateral G routine, lateral G of the vehicle is calculated only when the vehicle is determined to be in the turning state. Thus, it is possible to prevent erroneous estimation of lateral G when the vehicle is in the straight advance state. When the vehicle is in the unstable state, since lateral G is set at the largest lateral acceleration Gymax, it is possible to control the vehicle to the stable side.

After deceleration Gx in forward and backward directions of the vehicle and acceleration Gy in the lateral direction are obtained as shown in FIG. 17, synthesized G of the vehicle, that is, a road surface μ estimated value, is calculated. Specifically, the synthesized G is obtained by means of vector calculation of deceleration Gx in forward and backward directions of the vehicle and acceleration Gy in the lateral direction.

Figure 12:
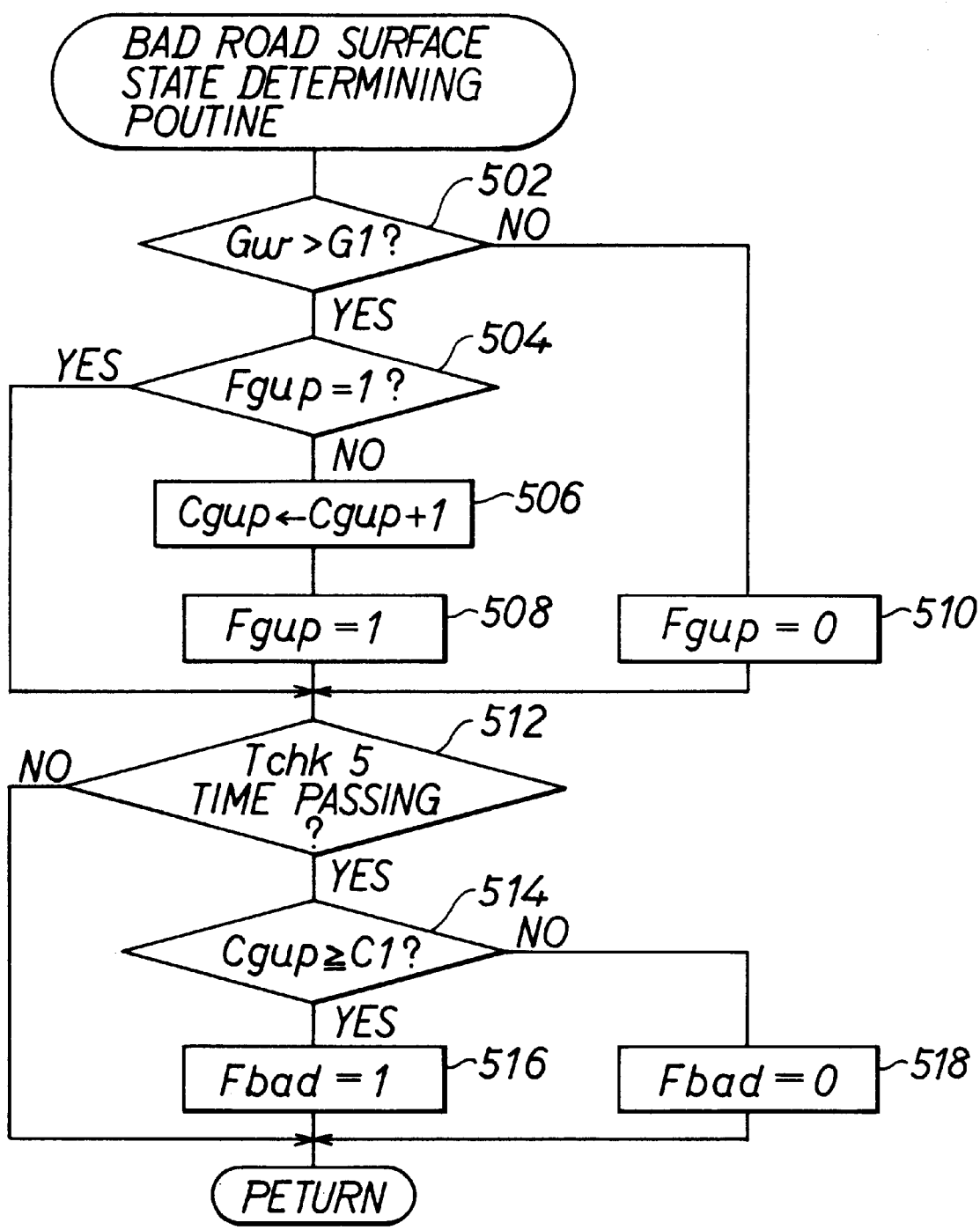
FIG. 12 is a flow chart showing an example of bad road state determining means in the second embodiment.

Processing contents of the bad road surface state determining means (step 500) are shown in FIG. 12. In FIG. 12, in step 502, wheel acceleration Gw and bad road determining reference acceleration G1 are compared, and if Gw is below G1, processing moves to step 510 and a count determining flag Fgup is set to "0". This determining flag Fgup is set to "1" when wheel acceleration Gw exceeds reference acceleration G1, this "1" is held as long as this state continues, and when Gw is below G1, this flag is reset to "0". This determining flag Fgup is utilized by a bad road counter Cgup for counting the number of times that Gw exceeds G1.

On the other hand, if wheel acceleration Gw is found to be above the bad road determining reference acceleration Gi in step 502, step 504 determines whether the count determining flag Fgup is "1". If the determining flag becomes "1", the bad road counter Cgup is not counted, and only when this is "0" the bad road counter Cgup is counted. Then in step 508 the count determining flag Fgup is set to "1".

Step 512 determines whether bad road determination time Tchk5 has passed. If not yet passed, processing returns to the main routine. If Tchk5 passes, step 514 determines whether a value Cgup obtained by counting the number of times that wheel acceleration Gw exceeds bad road determining reference acceleration G1 within Tchk5 is above the bad road determining count C1. If this is more than the bad road determining count C1, processing moves to step 516, the bad road determining flag Fbad is set to "1" and processing returns to the main routine. On the other hand, if Cgup is found to be below C1 in step 514, in step 518 the bad road flag Fbad is reset to "0" and processing returns to the main routine.

Figure 18:
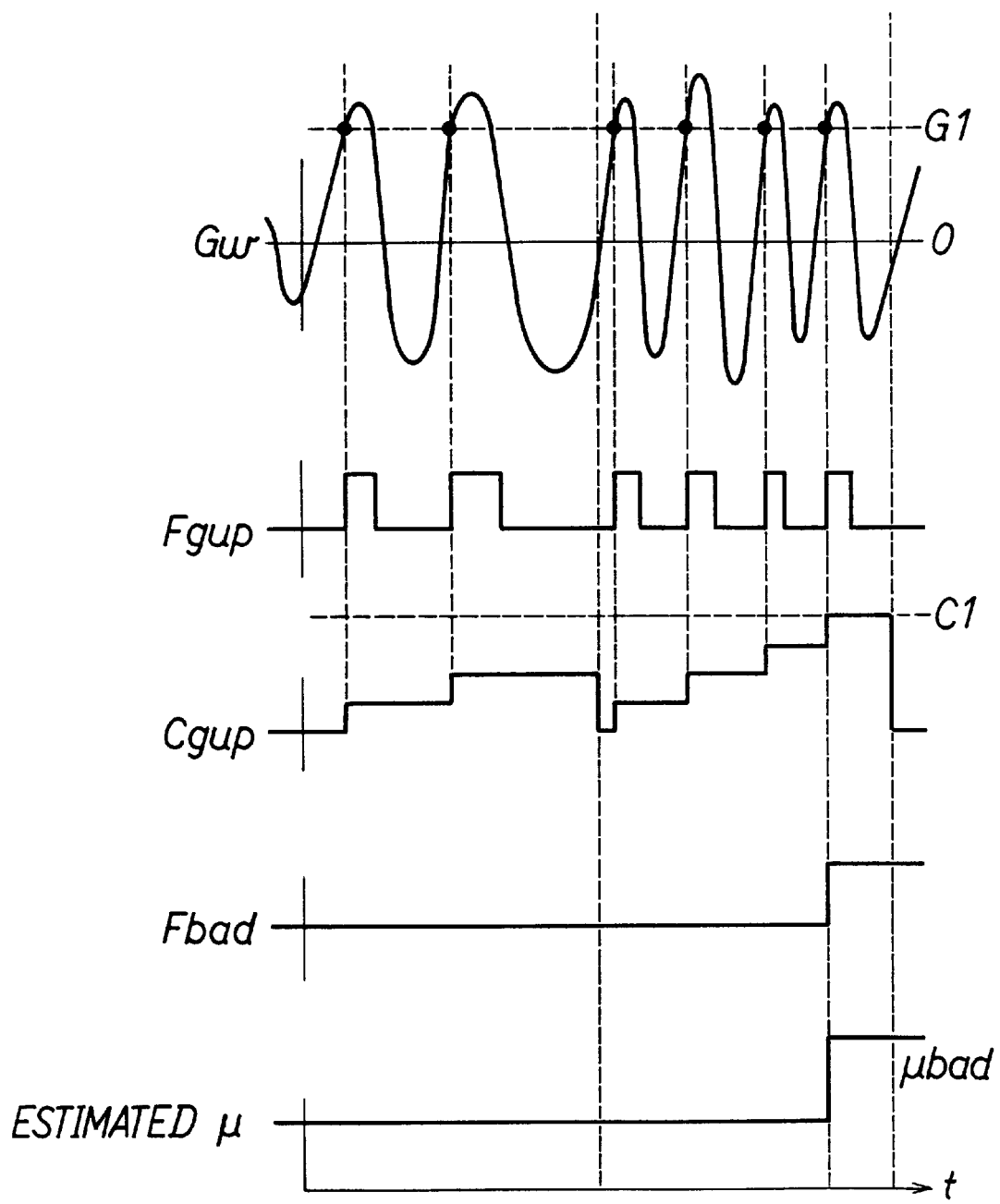
FIG. 18 is a time chart at a time of executing bad road state determination processing in FIG. 12.

A series of operations of the bad road determining means are shown in FIG. 18. In FIG. 18, for every determining time Tchk5, the count determining flag Fgup is reset depending on whether wheel acceleration Gw exceeds bad road determining reference acceleration Gi. By means of the count determining flag Fgup, counting up of the bad road counter Cgup is executed, and when a count exceeds the bad road determining count C1, indicating a bad road state, the bad road determining flag Fbad is set.

Here, if the bad road state is determined, the estimated road surface $\mu$ is changed to the bad road $\mu$ value $\mu$bad. This bad road $\mu$ value $\mu$bad is preferably a settable largest road surface $\mu$ value. However, a method of changing the value depending on a magnitude of wheel acceleration Gw or a counted value of the bad road counter Cgup may be used.

Figure 13:
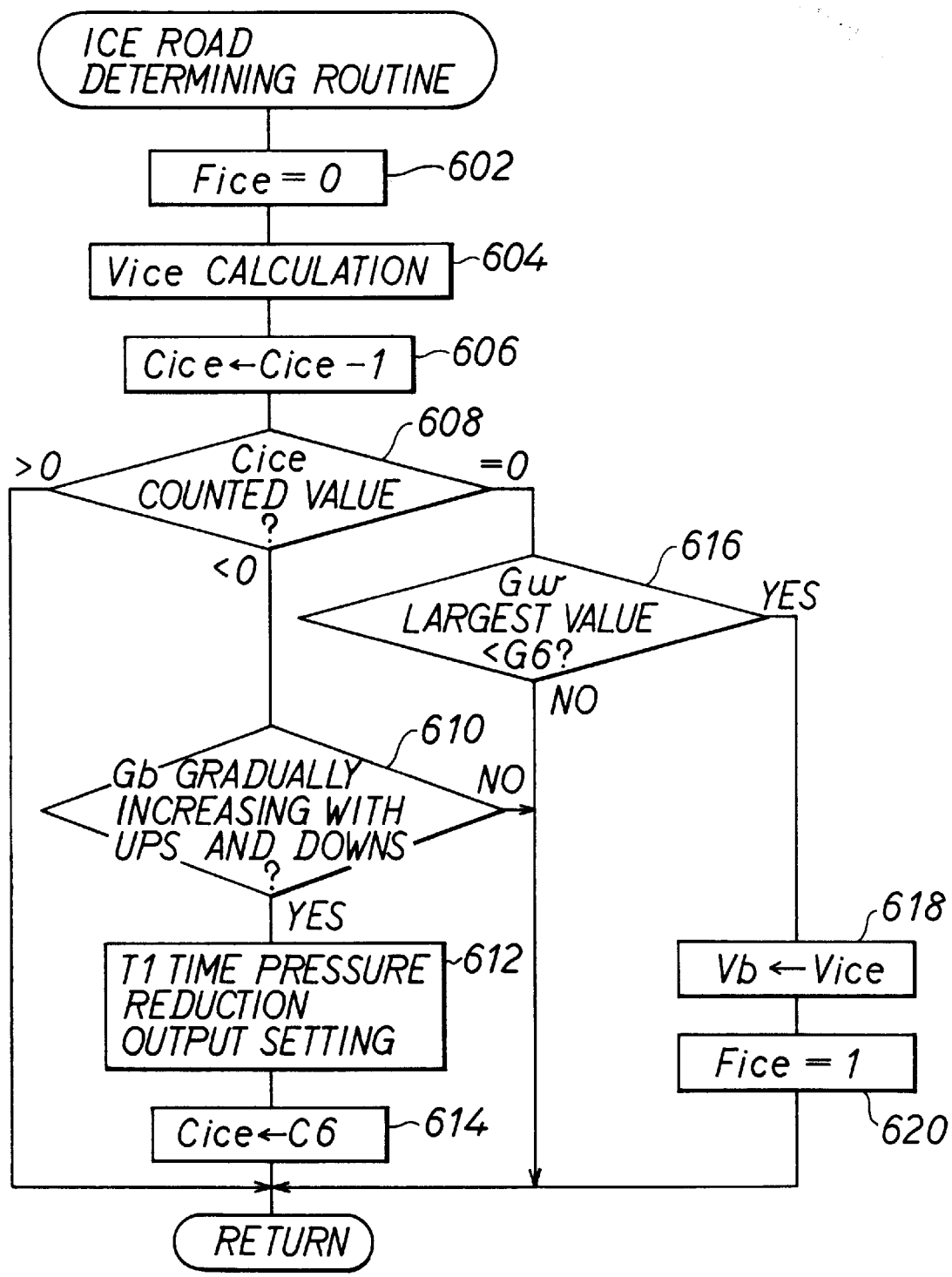
FIG. 13 is a flow chart showing an example of icy road determining means in the second embodiment.

Processing contents of icy road travelling determination (step 600) are shown in FIG. 13.

In the icy road travelling determination, by resetting an icy road determining flag Fice to "0" at every start of processing, the estimated vehicle body speed Vb can be changed to an icy road estimated vehicle body speed Vice each time icy road travelling is determined before ABS control and stability of the vehicle on the icy road can be secured.

In FIG. 13, in step 602, the icy road determining flag Fice is reset to "0" and in step 604, the icy road estimated vehicle body speed Vice is calculated. The icy road estimated vehicle body speed Vice can be an estimated vehicle body speed occurring on a road surface $\mu$ corresponding to an icy road. Thus, by changing the estimated vehicle body speed Vb to the icy road estimated vehicle body speed Vice when an icy road is indicated, the estimated vehicle body speed Vb is brought close to the real vehicle body speed and stability of the vehicle can be sufficiently secured.

In step 606, by counting down of the icy road counter Cice, an icy road time is determined. In step 608, depending on the counted value of the icy road counter Cice, icy road determination is executed. That is, since the icy road counter is counted down in the step 606, Cice<0 and processing moves to step 610. In step 610, a characteristic of icy road travelling is monitored. Specifically, if estimated vehicle body deceleration Gb is determined to gradually increase with ups and downs, processing moves to step 612 and an instruction output for reducing pressure during time T1 is set. Though a characteristic of the icy road is determined in step 610, by monitoring whether the wheel speed is restored after brake pressure reduction, icy road travelling can be further accurately determined. Therefore, determination of icy road travelling may only be performed in step 610.

In step 614, by setting an icy road count C6 on the icy road counter Cice, a time for determining whether wheel speed is restored after brake pressure reduction of time T1 can be determined. The icy road count C6 must be a value allowing sufficient wheel restoring after brake pressure reduction of time T1. After processing in step 614, processing returns to the main routine. On the other hand, if a characteristic of the icy road is not determined in step 610, processing directly returns to the main routine.

After the icy road count C is set on the icy road counter Cice in step 614, processing moves again from the main routine to step 606, to count down the icy road counter Cice, and if the icy road counter Cice>0 in step 608, this is not the time for determining whether wheel speed is restored after brake pressure reduction and thus processing returns to the main routine. The above processing is repeated, and if it is determined, in step 608, that the icy road counter Cice=0, then this is the time for determining whether wheel speed is restored after brake pressure reduction and then processing moves to step 616.

In step 616, the restored speed of the wheel after brake pressure reduction is determined depending on the magnitude of wheel acceleration Gw. If the largest value of wheel acceleration Gw from after pressure reduction to the time for determining whether the restored wheel speed is below icy road acceleration G6, processing moves to step 618. That is, if the restoring rate of the wheel is small even when braking pressure is reduced, extremely low $\mu$ road, such as the icy road and the like, is indicated. In this case, the estimated vehicle body speed Vb is changed to the icy road estimated vehicle body speed Vice produced in step 604, and in step 620 the icy road determining flag Fice is set to "1" and processing returns to the main routine.

On the other hand, if the largest value of wheel acceleration Gw is found to be above the icy road acceleration G in step 616, the restoring rate of the wheel after pressure reduction is large, and not an extremely low $\mu$ road surface is determined, and processing returns to the main routine.

Figure 19:
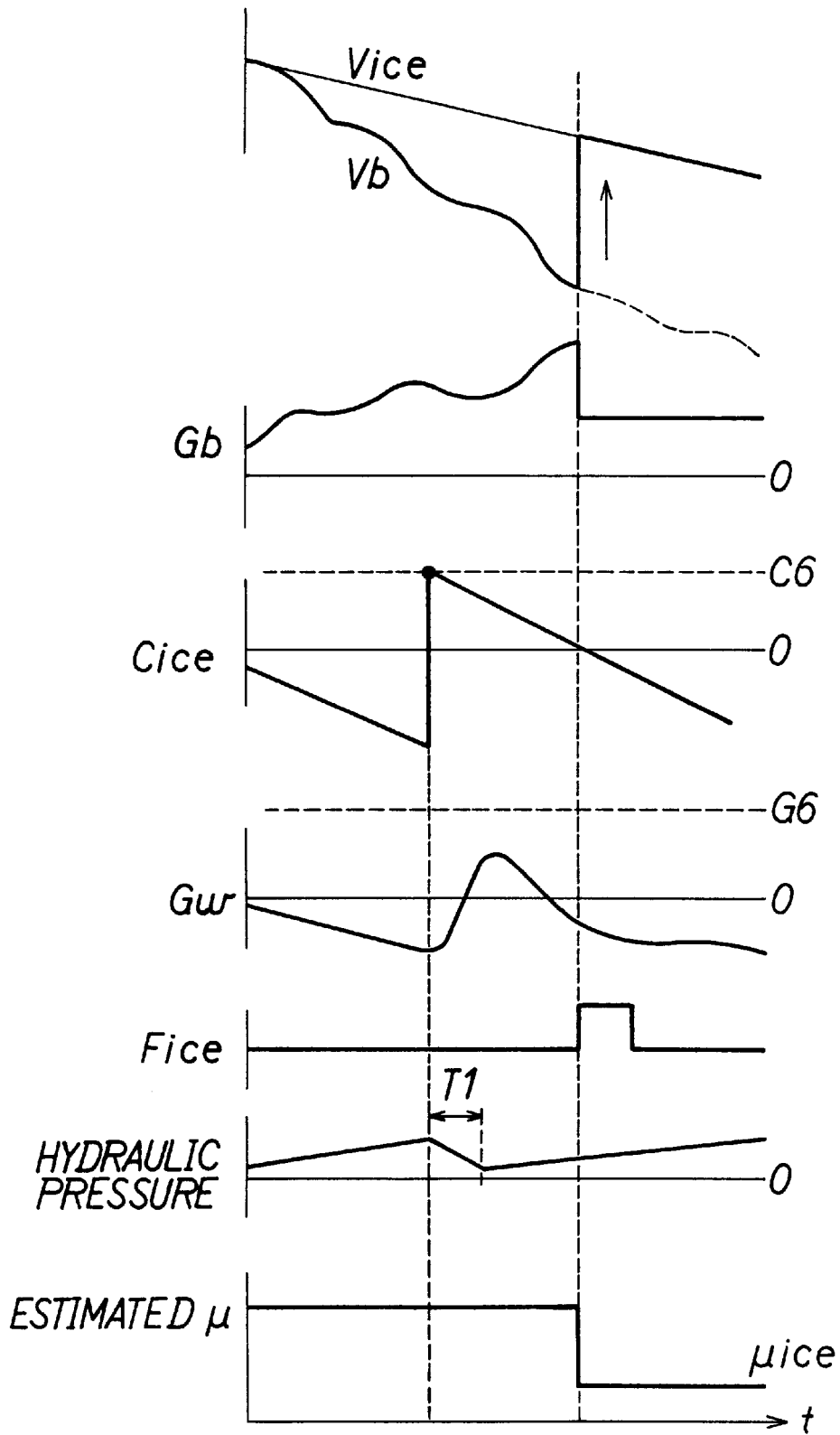
FIG. 19 is a time chart at a time of executing icy road determination processing in FIG. 13.

A series of operations of the icy road determining means is shown in FIG. 19. When a characteristic of icy road travelling is determined by estimated vehicle body deceleration Gb, hydraulic brake pressure is reduced for time T1, the icy road count C6 is set on the icy road counter Cice and restoring of the wheel speed after pressure reduction is monitored. If wheel acceleration Gw reaches above the icy road acceleration G6 while the icy road counter Cice is counted down to 0, with a time of Cice=0, the icy road flag Fice is set to "1", and an icy road state is indicated. By changing an estimated vehicle body speed Vb to the icy road estimated vehicle body speed Vice determined beforehand, stability of the vehicle is secured.

Furthermore, since the estimated road surface $\mu$ has been determined to be that of an icy road, by changing the estimated road surface $\mu$ to the icy road surface $\mu$ value $\mu$ice, determination of brake pressure control start thereafter is executed. The icy road surface $\mu$ value $\mu$ice may be changed depending on the magnitude of restoration G of wheel acceleration Gw after pressure reduction of time T1.

Figure 14:
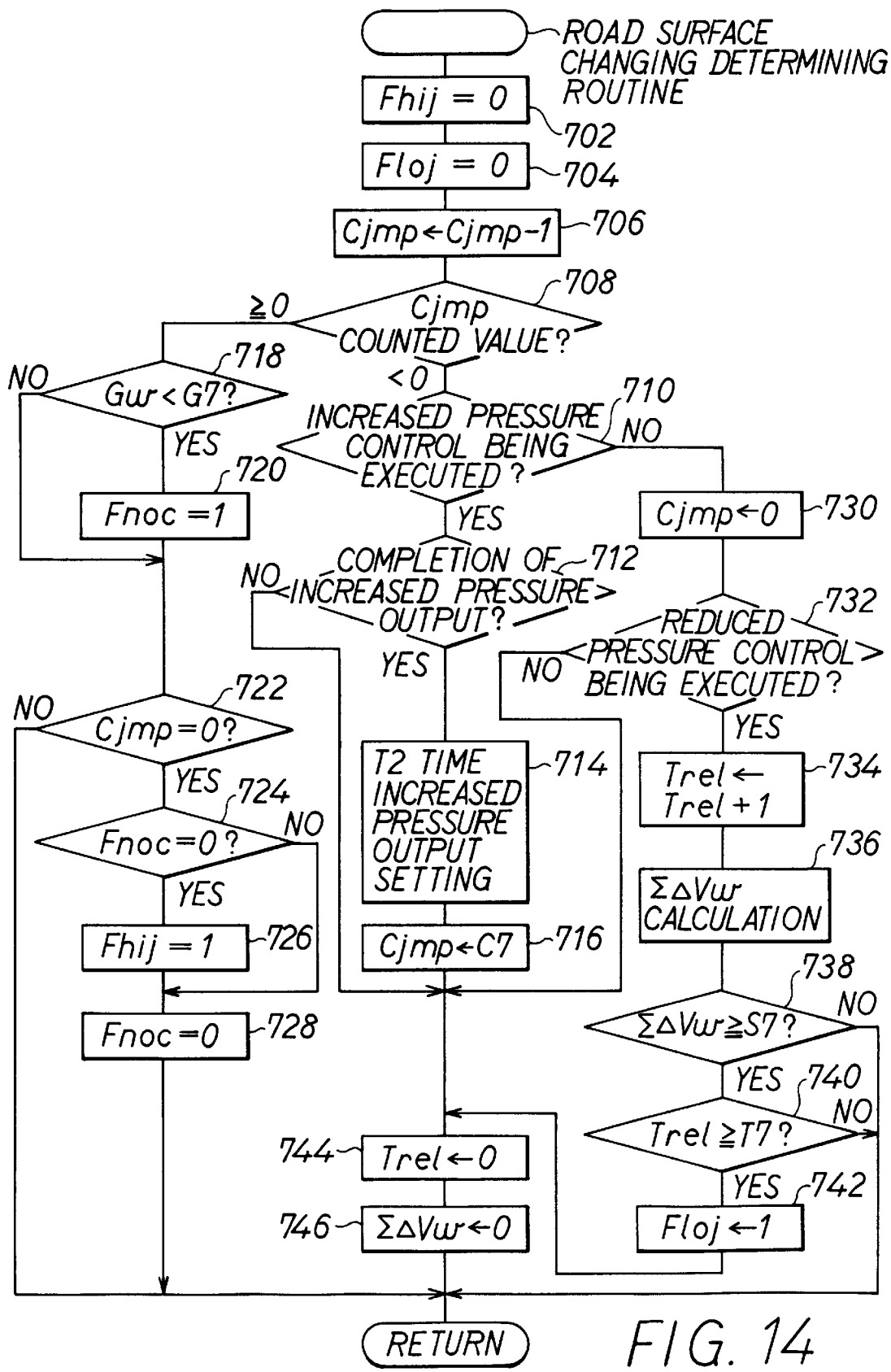
FIG. 14 is a flow chart showing an example of road surface change determining means in the second embodiment.

Processing contents of the road surface change determining means (step 700) during brake pressure control are shown in FIG. 14.

In FIG. 14, in step 702, a high $\mu$ road change flag Fhij is set to "0". This Fhij is set to "1" when a high $\mu$ road change is determined, and after estimated road surface $\mu$ is changed, this is reset to "0" in step 702. Thus, during brake pressure control, determination of high $\mu$ road change can be executed a number of times. Similarly, in a step 704, a low $\mu$ road change flag Floj is set to "0".

In step 706, a low $\mu$ counter Cjmp is counted down. Then, in step 708, depending on the counted value of the high $\mu$ counter Cjmp, whether to execute high $\mu$ road change determination from step 710 or a low $\mu$ road change from step 730 and thereafter is determined.

First, usually, since the high $\mu$ counter Cjmp has been counted down in step 706, Cjmp<0 and thus processing moves to step 710. In step 710, whether currently executed control is in increased pressure control or not is determined. In the case of increased pressure control, processing moves to step 712 and whether the specified increased pressure output is completed is determined. Here, as a control state in which specified increased pressure is generated, it is considered that an optimum hydraulic level may not be reached even though the increased pressure is continuously generated when hydraulic level is higher than a current hydraulic level. Specifically, even when a hydraulic level has almost reached a level of starting brake pressure control by means of increased pressure output, a slipping level of a wheel is not increased enough to allow pressure reduction.

That is, if changing to the high $\mu$ road is made during brake pressure control on the low $\mu$ road in which the hydraulic level is low, hydraulic control is necessary at the high hydraulic level. However, since the increased pressure output is set on the basis of the low hydraulic level, pressure must be reduced even after the increased pressure outputs are all completed and thus a wheel slipping state does not increase. Therefore, if output of specified increased pressure is determined in step 712, since changing to the high $\mu$ road is conceivable, processing moves to step 714 and increased pressure for confirming high $\mu$ road changing is output for time T2. By setting the confirming increased pressure time T2 larger than a rising gradient of increased pressure at the time of specified pressure output, the high $\mu$ road changing can be surely determined.

In step 716, a low $\mu$ count C7 is set on the high $\mu$ counter Cjmp and thereby speed reduction of the wheel after increasing brake pressure can be monitored. Then, in steps 744 and 746, a pressure reduction timer Trel for determining low $\mu$ road changing and the integrated value $\Sigma\Delta$Vw of differences $\Delta$Vw between the estimated vehicle body speed Vb and the wheel speed Vw calculated in step 136 are cleared to zero and processing returns to the main routine.

On the other hand, if completed specified increased pressure output is not determined in step 712, directly moving to step 744, similar processing is executed.

Next, explanation will be made of a case where increased brake pressure for confirming high $\mu$ road change is output in step 714.

After a high $\mu$ count C7 is set on the high $\mu$ counter Cjmp in step 716, processing moves from the main routine again to step 706, Cjmp is counted down, and if Cjmp$\geq$0 in step 708, processing moves to step 718 in order to monitor wheel speed reduction caused by output of increased pressure for confirming high $\mu$ road change.

In step 718, wheel speed reduction after increasing pressure is detected on the basis of the magnitude of the wheel acceleration Gw. That is, if wheel acceleration Gw from after pressure increase to a time for determining wheel speed reduction is below change determining acceleration G7, processing moves to step 720, determining prohibit flag Fnoc is set to "1" and processing moves to step 722. Thus, it can be determined that the current road surface is not a high $\mu$ road. That is, in the step 714, by outputting increased pressure for confirming high $\mu$ road change having a gradient larger than a rising gradient of increased pressure by specified pressure increase, erroneous determination of high $\mu$ road change can be prevented and accurate determination can be made because the wheel speed always falls if the road surface is a medium or low $\mu$ road.

On the other hand, if wheel acceleration Gw is found to be above the change determining acceleration G7, processing directly moves to step 722. In step 722, a time for determining high $\mu$ road change is determined to be at the time of the high $\mu$ counter Cjmp=0, and, then moving to step 724, processing is executed. At the time of Cjmp$\neq$0, returning to the main routine a wheel speed reduction is monitored until reaching the determining time. In step 724, if the determination prohibit flag Fnoc is "0", indicating no confirmation of wheel speed reduction due to output of increased pressure for high $\mu$ road change, processing moves to step 726. In step 726, high $\mu$ road change is produced, the high $\mu$ road change determining flag Fhij is set to "1", and in step 728, the determination prohibit flag Fnoc is reset to "0" and processing returns to the main routine.

On the other hand, if in step 724, the determination prohibit flag Fnoc is found to be set to "1", that is, the road surface is confirmed to be a medium/low $\mu$ road, when wheel speed reduction is determined by output of increased pressure for confirming high $\mu$ road change, a change to a high $\mu$ road is not determined and similar processing is executed after moving to step 728.

Figure 20:
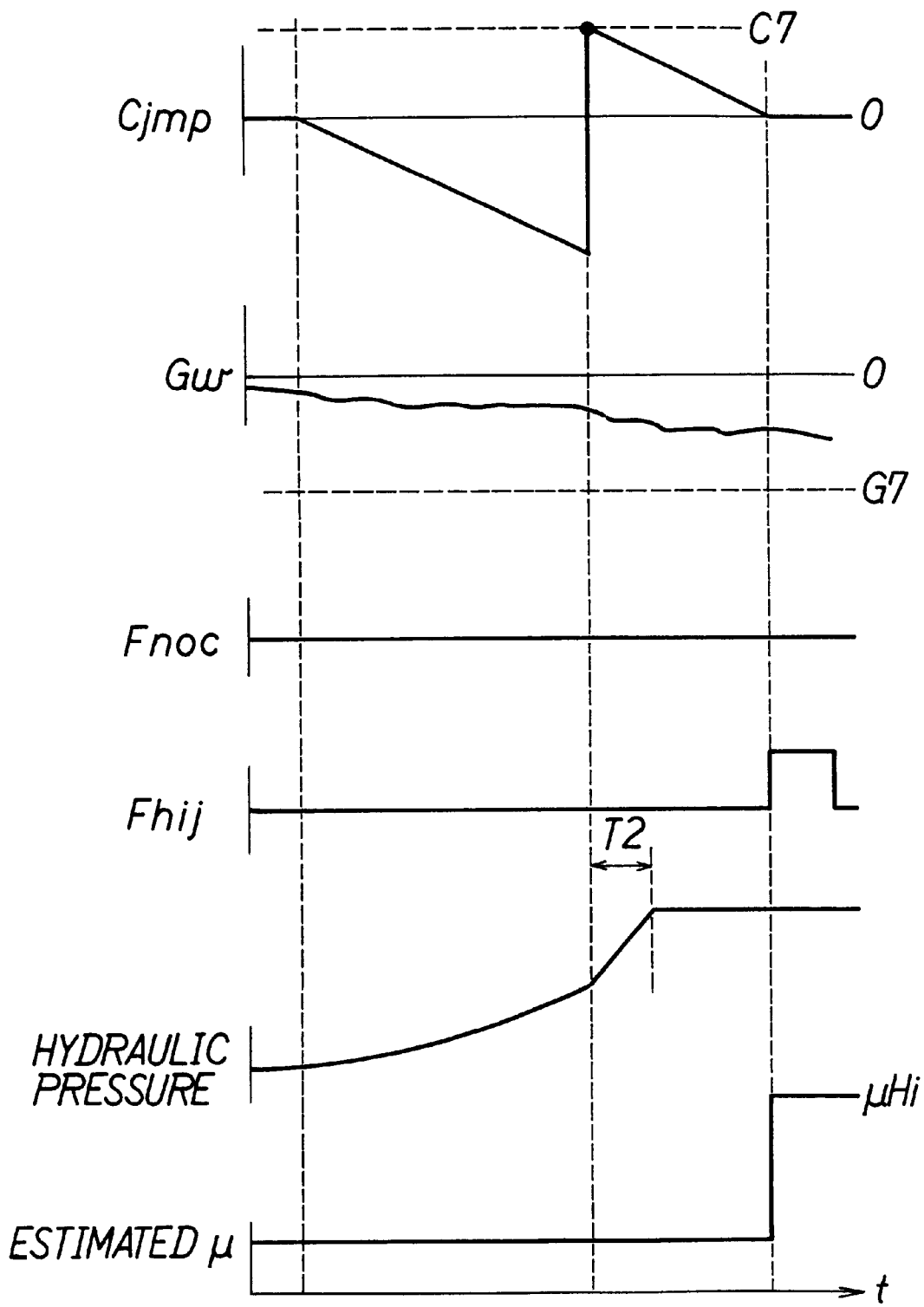
FIG. 20 is a time chart at a time of executing high $\mu$ road surface change determination processing in FIG. 14.

A series of operations of the high $\mu$ road change determining means is shown in FIG. 20. As shown in FIG. 20, when specified increased pressure output is completed, increased pressure for confirming a change having a gradient larger than a rising gradient of increased pressure output at the time of the specified pressure increase is output for time T2, the high $\mu$ count C7 is set on the high $\mu$ counter Cjmp, and wheel speed reduction after increased pressure output is monitored. If wheel acceleration Gw falls below the change determining acceleration G7 during the period of time when the high $\mu$ counter Cjmp is counted down and reaches 0, the determination prohibit flag Fnoc remains at "0". Thus, with a timing of Cjmp=0, the high $\mu$ road change determining flag Fhij is set to "1", and a high $\mu$ road is indicated.

When change to the low $\mu$ road is determined, the estimated road surface $\mu$ is changed to the high $\mu$ value $\mu$Hi and ABS control is executed. Here, a method may be used for changing the high $\mu$ value $\mu$Hi which depends on the magnitude of wheel acceleration Gw indicating wheel speed reduction after increased pressure output.

Next, a processing in which determination of change to the low $\mu$ road is executed is explained.

If current control is other than increase pressure control in step 710, processing moves to step 730 and the high $\mu$ counter Cjmp is cleared and processing moves to step 732. In step 732, whether or not current control is in reduced pressure control is determined. If the current control is not the reduced pressure control, processing moves directly to step 744 to execute the above-described processing.

If reduced pressure control is determined at the step 732, moving to step 734, pressure reduction timer Trel for determining a change to the low $\mu$ road is counted up. Then, step 736 calculates the integrated value $\Sigma\Delta$Vw of speed differences $\Delta$Vw between the estimated vehicle body speed Vb and the wheel speed Vw calculated in step 136, and processing moves to step 738. Step 738 determines whether the integrated value $\Sigma\Delta$Vw is above a determined slipping amount S7. That is, depending on the magnitude of the $\Sigma\Delta$Vw, a wheel speed reduction (slipping) is determined.

When ΣΔVw is below S7, change to a low μ road is not determined since wheel speed reduction (slipping) is small and processing directly returns to the main routine. On the other hand, when a slipping amount is above S7 and wheel speed reduction (slipping) is large, processing moves to step 740 to determine whether a time of pressure reduction timer Trel for determining a change to the low μ road is above a determining time T7. When the pressure reduction timer Trel is below T7, since restoration of the wheel speed after brake pressure reduction is started even when the wheel speed is reduced, change to the low μ road is not determined and processing directly returns to the main routine.

On the other hand, if it is determined that pressure reduction time is over the determining time T7 and it has been taking time for the wheel to be restored after pressure reduction is started, understanding that this is a change to a low μ road, processing moves to step 742 and a low μ road change determining flag Floj is set to "1". Then, in step 744, the above-described processing is executed. That is, when a change to the low μ road is made, by determining that the wheel speed falls greater than the estimated vehicle body speed Vb and that it takes a long time for restoring the wheel speed even when pressure reduction is continued, a change to the low μ road is determined.

On the high μ road, since restoration of wheel is fast by means of pressure reduction even when the wheel speed falls, pressure reduction time is made short. Since falling itself is small, a total slipping amount of the wheel is made small and conditions for determining the change to the low μ road are not met.

Figure 21:
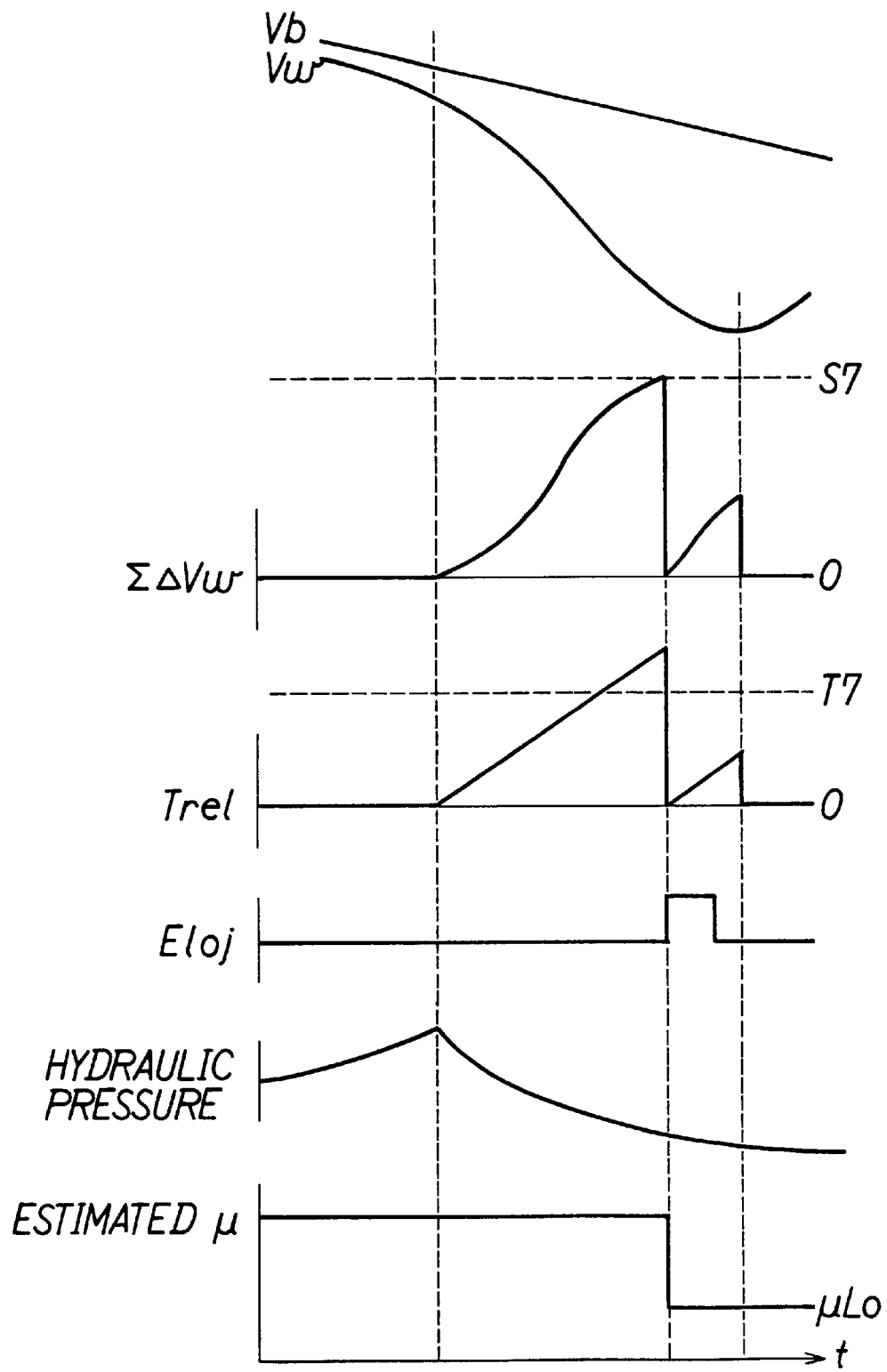
FIG. 21 is a time chart at a time of executing low $\mu$ road surface change determination processing in FIG. 14.

A series of operations of the low μ road change determining means is shown in FIG. 21. As shown in FIG. 21, when the wheel speed falls and pressure reduction is started, the pressure reduction timer Trel is counted up and at the same time, the integrated value ΣΔVw of speed differences ΔVw between the estimated vehicle body speed Vb and the wheel speed Vw is calculated. By means of the integrated value ΣΔVw, the wheel speed reduction is expressed as a physical amount.

When the pressure reduction timer Trel is over the determining time T7 and the integrated value ΣΔVw is above the determined slipping amount S7, the low μ road change determining flag Floj is set to "1". That is, a change to the low μ road is determined. The estimated road surface μ is changed to the low μ value μLo when the change to the low μ road is determined and ABS control is executed. Here, a method may be used for changing the low μ value μLo on the basis of the integrated value ΣΔVw and by means of the pressure reduction timer Trel.

Figure 15:
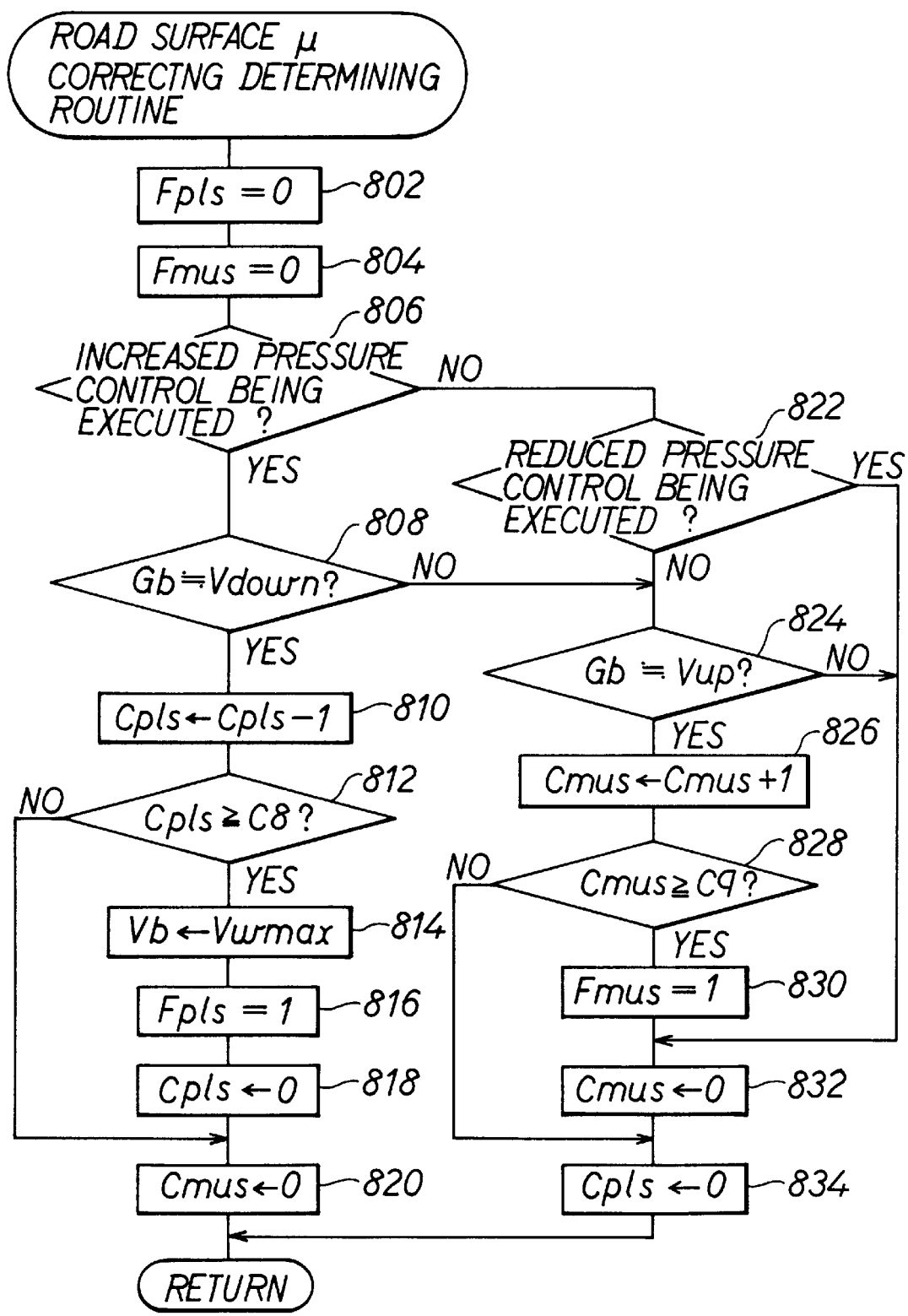
FIG. 15 is a flow chart showing an example of road surface $\mu$ correction determining means in the second embodiment.

Processing contents of the road surface μ correction determining means (step 800) during brake pressure control are shown in FIG. 15.

In FIG. 15, in step 802, the road surface μ increase flag Fpls is set to "0". The flag Fpls is set to "1" when correction of the road surface μ to the side making the road surface μ high, and after correction of the estimated road surface μ is executed, the flag Fpls is reset to "0" in step 802. Thus, during brake pressure control, correction of the road surface μ to the side of the high road surface μ is determined for any number of times.

Likewise, in step 804, a road surface μ reduction determining flag Fmus is set to "0". Then, in step 806, whether currently executed control is pressure increase control or not is determined. If the pressure increase control is in process, processing moves to step 808 to determine whether the estimated vehicle body deceleration Gb calculated in step 106 is almost equal to deceleration limit Vdown referred to at the time of estimated vehicle body speed Vb calculation. If the estimated vehicle body deceleration Gb is almost equal to the deceleration limit Vdown, in step 812, the increase counter Cpls is counted up and processing moves to step 812. That is, the determining means for correcting the road surface μ to the high side is based on the characteristic that the wheel speed does not fall enough to produce pressure reduction though pressure increase control continues and the estimated vehicle body speed Vb continues to be created with the deceleration limit Vdown.

On the other hand, if currently executed control is not found to be pressure increase control in step 806, processing moves to step 822 and, if currently executed control is pressure reduction control, the reduction counter Cmus in step 832 and the increase counter Cpls in step 834 are simultaneously cleared and processing returns to the main routine.

If the estimated vehicle body deceleration Gb is different from Vdown in step 808 or if currently executed control is not pressure reduction control in step 822, processing moves to step 824 and road surface μ lowering determination is executed (the determining processing will be described later).

Step 812 determines whether the increase counter Cpls is over an increase counted value C8. If the Cpls is below C8, since a time for correcting the road surface μ to the high side is not determined, the reduction counter Cmus is cleared to zero in step 820 and processing returns to the main routine. On the other hand, if the increase counter Cpls is found to be above the increase counted value C8 in step 812, a time for correcting the road surface μ to a high side is not determined, and the estimated vehicle body speed vb is changed to a largest wheel speed Vwmax in step 814. In step 816, the road surface μ increase flag Fpls is set to "1". Then, in steps 818 and 820, the increase counter Cpls and the reduction counter Cmus are cleared to zero and processing returns to the main routine.

Figure 22:
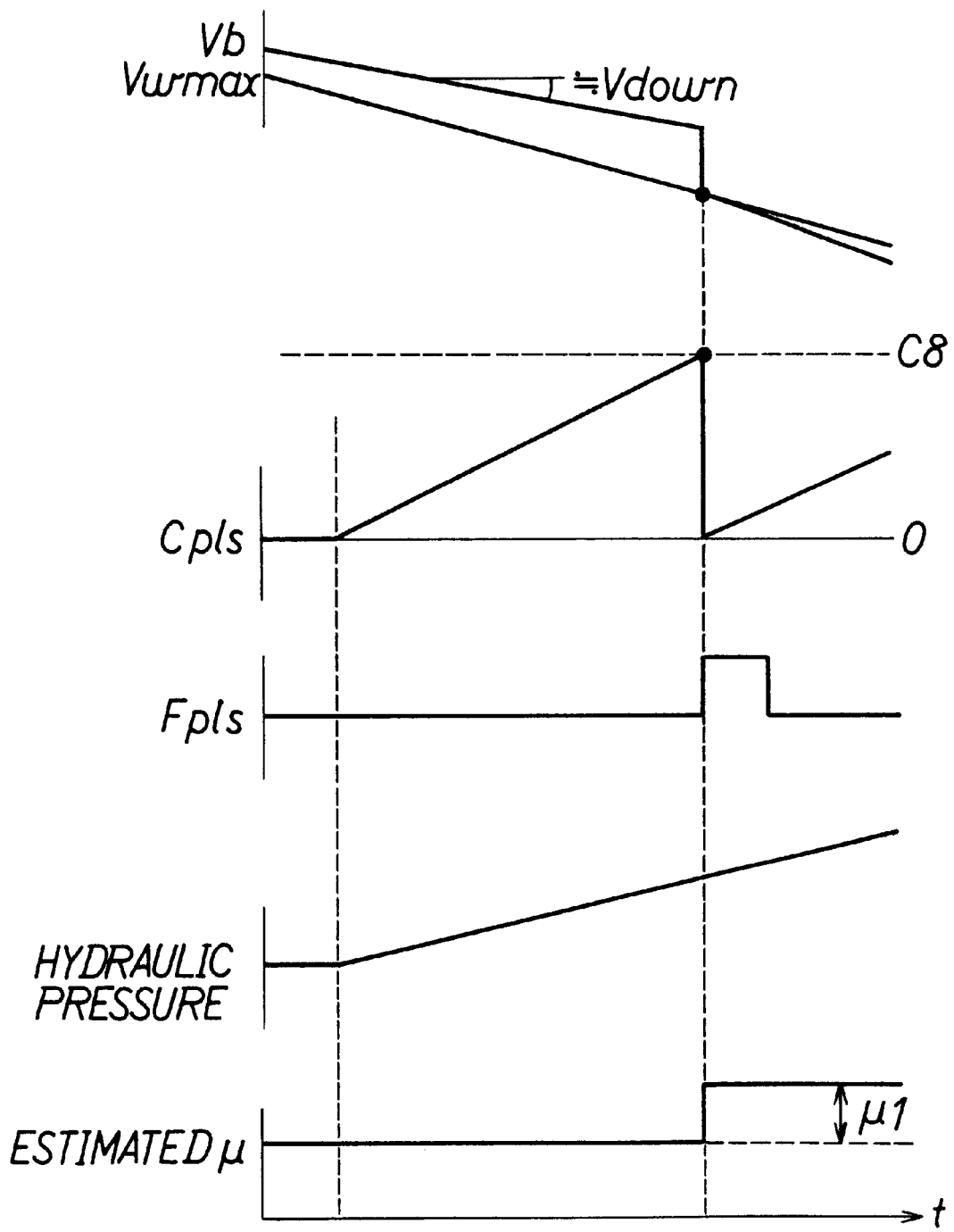
FIG. 22 is a time chart at a time of processing for determining correction to a side of a high road surface $\mu$ in FIG. 15.

A series of operations of the determining means for correcting the road surface μ to the high side are shown in FIG. 22. As shown in FIG. 22, when current hydraulic pressure rises because of pressure increase control, if the state where the estimated vehicle body speed Vb continues to be produced by the deceleration limit Vdown is counted to the increase counted value C8 by the increase counter Cpls, the road surface μ increase flag Fpls is set to "1", and correcting the road surface to a high side is necessary.

As for the estimated road surface μ, if necessity of correcting the road surface μ to the high side is determined, an increase correction value μ1 is added to a current road surface μ value. At the same time, by changing the estimated vehicle body speed Vb to the largest wheel speed Vwmax, a deviation from a real vehicle body speed can be corrected. When the estimated road surface μ is smaller than the real road surface μ, the deceleration limit Vd obtained by the function F1(μ) of the estimated road surface μ is made small and as a result, the estimated vehicle body speed Vb created by the deceleration limit Vdown is created far different from the real vehicle body speed.

Next, the determining means for correcting the road surface μ to the low side is explained.

In step 824, when the estimated vehicle body speed Vb is not produced with the deceleration limit Vdown or when currently executed control is not found to be pressure reduction control in step 822, step 824 determines whether the vehicle body deceleration Gb is almost equal to the acceleration limit Vup referred to at the time of calculating the estimated vehicle body speed Vb. If Gb≠V, that is, the wheel speed is larger than Vup, it is determined that the estimated vehicle body speed is lower than the real vehicle body speed. Moving to the processing of step 826, the reduction counter Cmus is counted up and processing moves to step 828.

Step 828 determines whether the reduction counter Cmus is above a reduction counted value C9. If the Cmus is approximately equal to C9, a time for correcting the road surface μ to the low side is not determined and processing moves to step 834, the increase counter Cpls is cleared to zero and processing returns to the main routine.

On the other hand, if the reduction counter Cmus is found to be above the reduction counted value C9, a time for correcting the road surface μ to a side making the road surface μlow is determined, and a road surface μ lowering flag Fmus is set to "1" in step 830.

Then, in steps 832 and 834, the reduction counter Cmus and the increase counter Cpls are cleared to zero and processing returns to the main routine.

If GB≠Vup is not determined in step 824, since the estimated vehicle body speed is approximately equal to the real vehicle body speed, processing moves to step 832 and similar processing is executed so that processing returns to the main routine.

Figure 23:
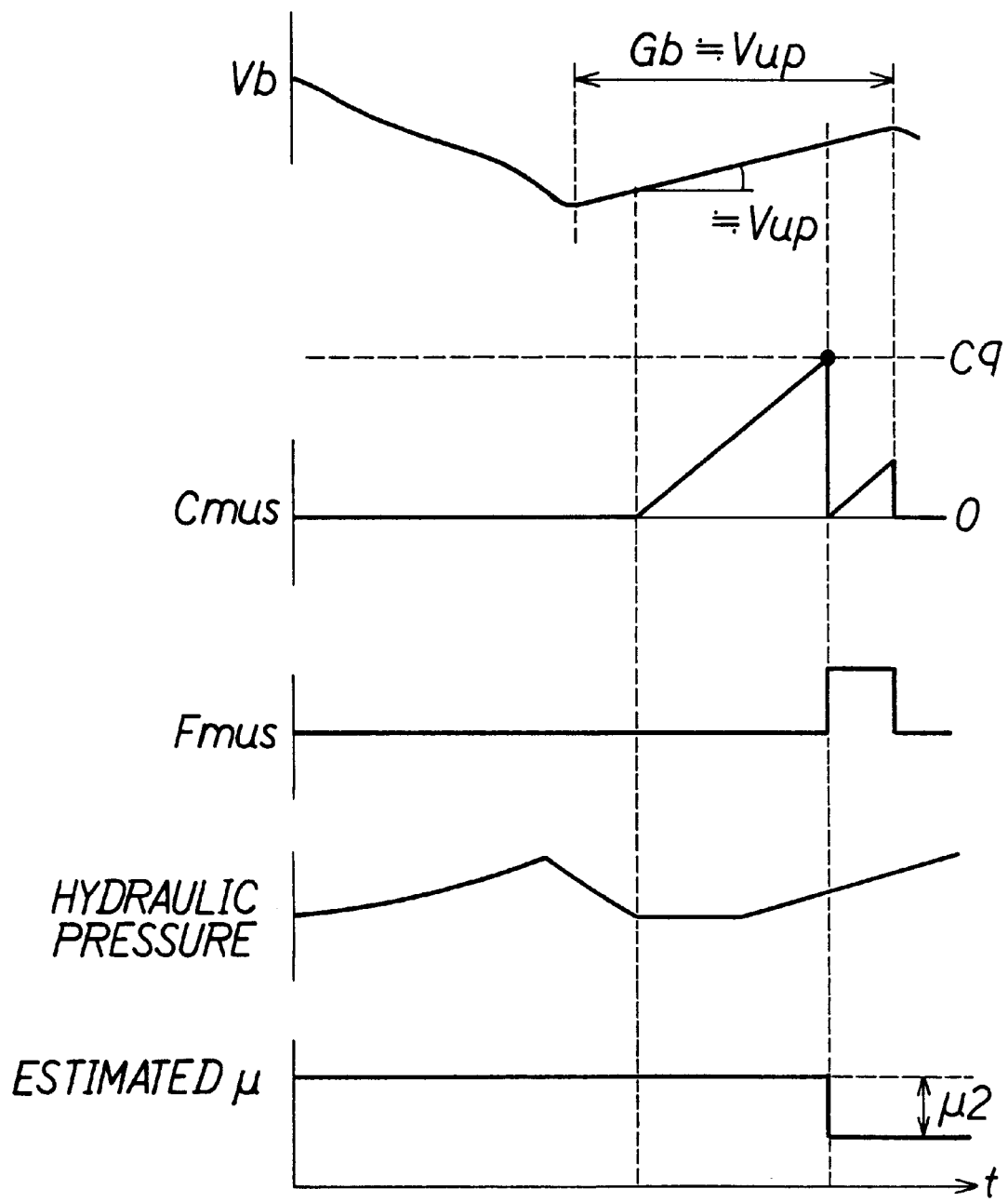
FIG. 23 is a time chart at a time of processing for determining correction to a side of a low road surface $\mu$ in FIG. 15.

A series of operations of the determining means for correcting the road surface μ to the low side are shown in FIG. 23. As shown in FIG. 23, the period where the estimated vehicle body speed Vb continues to be created with the acceleration limit Vup continues to be counted to the reduction counted value C9 by the reduction counter Cmus when current hydraulic pressure is holding or increase pressure control after the pressure reduction control, the road surface μ reduction determining flag Fmus is set to "1". Accordingly, necessity of correcting the road surface μ to the low side is determined.

As for the estimated road surface μ, when correction of the road surface μ to the low side is determined, by subtracting the reduction correction value μ2 from the current road surface μ value, correction of the road surface μ according to the road surface change is possible.

From the foregoing descriptions, in the ABS controller of the second embodiment, the road surface μ from an output from the wheel speed sensor and the output from brake pressure control can be estimated.

Furthermore, application of the invention is not limited to the above-described embodiments. The invention can be applied to other various modes within its scope and spirit.

For example, in the second embodiment, the estimated value of the road surface μ by various combinations of blocks, such as the forward and backward G estimating means+the road surface change determining means and the like can be determined.

As described above, in an antiskid controller of the present invention, road surfaces μ corresponding to continuous changes of road surfaces for travelling can be accurately estimated without any additional sensors such as a G sensor or the like, and using the estimated road surface μ, accurate antiskid control can be executed.

What is claimed is:

1. An anti-skid controller comprising:
   wheel speed detecting means for detecting a wheel speed of each wheel of a vehicle;
   vehicle body speed calculating means for calculating a vehicle body speed of the vehicle based on the wheel speed;
   calculating means for calculating an average change gradient of a wheel speed over a specified period of time of one of front and rear wheels of the vehicle in which a chance in the wheel speed detected by the wheel speed detecting means within the specified period of time is smallest;
   determining means for determining whether or not a change rate of a difference in wheel speeds between the front and rear wheels within the specified period of time reaches a specified value;
   estimating means for estimating a friction coefficient between a road surface and the wheel, at a point in time where the change rate is found to reach the specified value or higher by the determining means based on the average change of gradient calculated immediately prior to the point in time; and
   brake pressure control means for controlling brake pressure of a controlled wheel in accordance with anti-skid control reference determined by using at least the friction coefficient to prevent excess slipping of the controlled wheel based on a comparison between the vehicle body speed and a speed of the controlled wheel.

2. An anti-skid controller comprising:
   wheel speed detecting means for detecting a wheel speed of each wheel of a vehicle;
   calculating means for calculating an average change gradient of a wheel speed over a specified period of time of one of front and rear wheels of the vehicle in which a change in the wheel speed detected by the wheel speed detecting means within the specified period of time is smallest;
   forward and backward direction acceleration calculating means for converting the average change gradient calculated by the calculating means to a forward and backward direction acceleration of the vehicle corresponding to a road surface friction coefficient based on changes of the relative wheel speeds between the front and rear wheels detected by the wheel speed detecting means;
   vehicle body speed calculating means for calculating the vehicle body speed by using at least the forward and backward direction acceleration; and
   brake pressure control means for controlling brake pressure of a controlled wheel in order to prevent excess slipping of a controlled wheel based on comparison between the vehicle body speed and a wheel speed of the controlled wheel.

3. An anti-skid controller comprising:
   wheel speed detecting means for detecting a wheel speed of each wheel of a vehicle;
   vehicle body speed calculating means for calculating a vehicle body speed of the vehicle based on the wheel speed;
   determining means for determining whether or not a change rate within a specified period of time with respect to a difference in speeds between the front and rear wheels reaches a specified value or higher;
   forward and backward direction acceleration calculating means for calculating acceleration in forward and backward directions corresponding to a road surface friction coefficient of a road surface immediately before the determining means determines that the change rate reaches the specified value or higher;
   estimating means for estimating a friction coefficient between the wheels and the road surface based on the forward and backward direction acceleration calculated by the forward and backward direction acceleration calculating means; and brake pressure control means for controlling brake pressure of a controlled wheel in accordance with an anti-skid control reference determined by using at least the friction coefficient in order to prevent excess slipping of the controlled wheel based on a comparison between the vehicle body speed and a wheel speed of the controlled wheel.

4. An anti-skid controller comprising:

wheel speed detecting means for detecting a wheel speed of each wheel of a vehicle;

forward and backward direction acceleration calculating means for calculating acceleration in forward and backward directions corresponding to a road surface friction coefficient based on changes of relative wheel speeds between front and rear wheels detected by the wheel speed detecting means;

lateral direction acceleration calculating means for calculating acceleration in a lateral direction of the vehicle based on wheel speeds of left and right wheels detected by the wheel speed detecting means;

deceleration limit gradient calculating means for calculating a deceleration limit gradient of the vehicle based on the forward and backward direction acceleration and the lateral acceleration;

vehicle body speed calculating means for calculating a vehicle body speed of the vehicle by using at least the deceleration limit gradient; and brake pressure control means for controlling brake pressure of a controlled wheel in order to prevent excess slipping of the controlled wheel based on a comparison between the vehicle body speed and a wheel speed of the controlled wheel.

5. An anti-skid controller comprising:

wheel speed detecting means for detecting a wheel speed of each wheel of a vehicle;

forward and backward direction acceleration calculating means for calculating acceleration in forward and backward directions corresponding to a road surface friction coefficient based on changes of relative wheel speeds between front and rear wheels detected by the wheel speed detecting means before starting brake pressure control after braking torque is applied to the front and rear wheels of the vehicle;

lateral direction acceleration calculating means for calculating acceleration in a lateral direction of the vehicle based on wheel speeds of left and right wheels detected by the wheel speed detecting means before starting brake pressure control after braking torque is applied to the front and rear wheels of the vehicle;

deceleration limit gradient calculating means for calculating a deceleration limit gradient of the vehicle based on the forward and backward direction acceleration and the lateral direction acceleration;

vehicle body speed calculating means for calculating a vehicle body speed by using at least the deceleration limit gradient; and brake pressure control means for controlling brake pressure of a controlled wheel in order to prevent excess slipping of a controlled wheel based on a comparison between the vehicle body speed and a wheel speed of the controlled wheel.

6. An anti-skid controller according to claim 4 or 5, wherein the forward and backward direction acceleration calculating means calculates, when braking torque is applied to the front and rear wheels of the vehicle, acceleration in forward and backward directions corresponding to a road surface friction coefficient based on a changing rate of wheel speeds on a high speed side when a change in a difference between front and rear wheel speeds exceeding a specified value is produced.

7. An anti-skid controller according to claim 6, wherein the forward and backward direction acceleration calculating means calculates, when no change exceeding the specified value is produced in the difference between the front and rear wheel speeds and brake pressure control is started for the front or the rear wheels, the acceleration in forward and backward directions corresponding to the road surface friction coefficient based on the change rate of wheel speeds of the front or the rear wheels when the brake pressure control is started.

8. An anti-skid controller according to claim 4 or 5, further comprising:

determining means for determining whether a road surface is a bad road surface that causes wheel acceleration based on change conditions in wheel speed; and correcting means for correcting, when the determining means determines that the road surface is bad, the deceleration limit gradient calculated by the deceleration limit gradient calculating means to handle the bad road.

9. An anti-skid controller according to claim 8, wherein the correcting means corrects the deceleration limit calculated by the deceleration limit gradient calculating means to a bad road deceleration limit gradient value specified beforehand in order to handle a bad road.

10. An anti-skid controller according to claim 4 or 5, further comprising:

determining means for determining whether a road surface is an extremely low friction road surface based on a changing condition of a wheel speed when at least braking torque changes; and correcting means for correcting, when the determining means determines that the road travelled by the vehicle is an extremely low friction road surface,the deceleration limit gradient calculated by the deceleration limit gradient calculating means in order to handle the extremely low friction road surface.

11. An anti-skid controller according to claim 10, wherein the correcting means corrects a deceleration limit calculated by the deceleration limit gradient calculating means to a bad road deceleration limit gradient specified beforehand in order to handle the extremely low friction road surface.

12. An anti-skid controller according to claim 5, further comprising:

determining means for determining, based on a change of a wheel speed with respect to an increase or decrease in brake pressure after starting anti-skid control, whether the deceleration limit gradient calculated by the deceleration limit gradient calculating means is suitable for the road surface; and correcting means for correcting the deceleration gradient during antiskid control when the determining means determines that the deceleration limit gradient is not suitable for the road surface.

13. An anti-skid controller according to claim 12, wherein the determining means determines, when wheel speed reduction is below a reference value even after brake pressure is increased over a specified amount, that the deceleration limit gradient is not suitable for the road surface.

14. An anti-skid controller according to claim 12, wherein the determining means determines, when wheel speed reduction is over a reference value even after brake pressure is decreased, that the deceleration limit gradient is not suitable for the road surface.

15. An anti-skid controller according to claim 12, wherein the determining means determines, when brake pressures applied to a plurality of wheels are simultaneously increased in anti-skid control based on a wheel speed of each wheel, that the deceleration limit gradient is not suitable for the road surface.

16. An anti-skid controller according to claim 12, wherein the determining means determines, when wheel speed reaches the vehicle body speed or higher, that the deceleration limit gradient is not suitable for the road surface.

17. An anti-skid controller comprising:
wheel speed detecting means for detecting a wheel speed of each wheel of a vehicle;
vehicle body speed calculating means for obtaining a vehicle body speed based on the wheel speed of each wheel;
calculating means for calculating an average change gradient within a specified period of time with respect to the vehicle body speed calculated by the vehicle body speed calculating means;
determining means for determining whether a change rate within a specified period of time with respect to a speed difference between a rear wheel speed and the vehicle body speed or a speed difference between a front wheel speed and the vehicle body speed reaches a specified value or higher;
estimating means for estimating, when the determining means determines that the change rate reaches the specified value or higher, a friction coefficient between a road surface travelled by the vehicle and the wheels based on the average change gradient immediately before the chance rate reaches the specified value or higher; and
brake pressure control means for controlling brake pressure of a controlled wheel according to an anti-skid control reference determined by using at least the friction coefficient to prevent excess slipping of the controlled wheel based on a comparison between the vehicle body speed and the speed of the controlled wheel.

18. An anti-skid controller comprising:
wheel speed detecting means for detecting a wheel speed of each wheel of a vehicle;
vehicle body speed calculating means for obtaining a vehicle body speed based on the wheel speed of each wheel;
calculating means for calculating an average change gradient within a specified period of time with respect to a vehicle body speed calculated by the vehicle body speed calculating means;
determining means for determining whether either a change rate within a specified period of time with respect to a speed difference between a rear wheel speed and the vehicle body speed or a change rate within a specified period of time with respect to a speed difference between a front wheel speed and the vehicle body speed reaches a specified value or higher;
estimating means for estimating, when the determining means determines that one of the change rates reaches the specified value or higher, a friction coefficient between a road surface travelled by the vehicle and the wheels based on the average change gradient calculated by the calculating means immediately before the chance rate reaches the specified value or higher; and
brake pressure control means for controlling brake pressure of a controlled wheel corresponding to an anti-skid control reference determined by using at least the friction coefficient to prevent excess slipping of the controlled wheel based on a comparison between the vehicle body speed and the speed of the controlled wheel.

19. An anti-skid controller according to claim 4 or 5, wherein the forward and backward direction acceleration calculating means calculates, in a case where an integrated value obtained by periodically and sequentially integrating wheel speed differences between the front and rear wheels reaches a specified value or higher after braking torque is applied to the front and rear wheels of the vehicle, acceleration in forward and backward directions corresponding to a road surface friction coefficient based on a change rate of a wheel speed on a high speed side.

20. An anti-skid controller according to claim 1 or 3, wherein the determining means determines whether or not a change rate with respect to an integrated value obtained by periodically and sequentially integrating, within a specified period of time, wheel speed differences between the front and rear wheels of the vehicle reaches a specified value or higher.

21. An apparatus for a vehicle comprising:
wheel speed detection means for detecting a wheel speed of each of front and rear wheels of a vehicle;
wheel deceleration calculation means for calculating a wheel deceleration of each wheel from the detected wheel speed;
speed difference calculation means for calculating a difference in the detected speeds of the front and rear wheels;
timing determination means for determining, from the calculated speed difference, a timing of estimating a friction coefficient of a road surface; and
estimation means for estimating the friction coefficient from the calculated wheel deceleration, and irrespective of the calculated speed difference, at the determined timing of estimating.

22. An apparatus according to claim 21, wherein:
the speed difference calculation means further calculates a change rate of the calculated speed difference in a predetermined time period; and
the timing determination means determines the timing of estimating the friction coefficient from the calculated change rate attaining a predetermined reference.

23. An apparatus according to claim 21, wherein the estimation means estimates the friction coefficient from the calculated wheel deceleration of one of the wheels which has the smallest change in its detected wheel speed in a predetermined time period as compared to the change in wheel speed of the other wheels.

24. An apparatus according to claim 21, wherein the estimation means estimates the friction coefficient from the calculated wheel deceleration of one of the front and rear wheels which has the smallest change in its detected wheel speed in a predetermined time period as compared to the change in wheel speed of the other wheels.

25. An apparatus according to claim 21, further comprising:
vehicle body speed detection means for detecting a vehicle body speed from the detected wheel speed of each wheel;
control reference setting means for variably setting a control reference in accordance with the estimated road surface friction coefficient; and
brake control means for controlling a braking operation of the vehicle using the set control reference and based on the detected vehicle body speed and the detected wheel speed of each wheel.

26. A method comprising the steps of:
   detecting a wheel speed of each of front and rear wheels of a vehicle;
   calculating a wheel deceleration of each wheel from the detected wheel speed;
   calculating a difference in the detected speeds of the front and rear wheels;
   determining, from the calculated speed difference, a timing of estimating a friction coefficient of a road surface; and
   estimating the friction coefficient from the calculated wheel deceleration, and irrespective of the calculated speed difference, at the determined estimation timing.

27. A method for controlling a vehicle comprising the steps of:
   detecting a wheel speed of each of front and rear wheels of a vehicle;
   calculating a wheel deceleration from the detected wheel speed;
   determining from the detected wheel speed a timing of estimating a friction coefficient of a road surface;
   estimating the friction coefficient from the calculated wheel deceleration, and irrespective of the calculated speed difference, at the determined estimation timing; and
   controlling an operation of the vehicle using the estimated friction coefficient.

28. A method of controlling a vehicle comprising the steps of:
   detecting a wheel speed of each of front and rear wheels of a vehicle;
   calculating a wheel deceleration of each wheel from the detected wheel speed;
   determining which one of the wheels has the smallest change in the calculated wheel speed as compared to the change in wheel speed of the other wheels;
   estimating a friction coefficient from the calculated wheel deceleration of the determined one wheel; and
   controlling an operation of the vehicle using the estimated friction coefficient.

29. An apparatus according to claim 21, wherein:
   the speed difference calculation means further calculates a parameter using the calculated speed difference; and
   the timing determination means determines the timing of estimating the friction coefficient only when the calculated parameter attains a predetermined reference.

30. An apparatus according to claim 29, wherein the speed difference calculation means calculates a change rate of the calculated speed difference in a predetermined time period as the parameter.

31. An apparatus according to claim 21, wherein the estimation means estimates the friction coefficient variably in accordance with the calculated wheel deceleration.

32. A method according to claim 26, wherein the determining step calculates a change rate of the calculated difference and determines the timing of estimating the friction coefficient only when the calculated change rate is smaller than a predetermined reference.

33. A method according to claim 27, wherein the determining step integrates a difference in the detected wheel speeds of the front and rear wheels at a first predetermined interval and calculates a change rate of the integrated difference at a second predetermined interval longer than the first predetermined interval, to thereby determine the timing of estimating the friction coefficient only when the calculated change rate is less than a predetermined reference.

34. A method according to claim 28, further comprising the steps of:
   calculating a difference in the detected wheel speeds of the front and rear wheels at a first predetermined interval;
   calculating a change rate of the calculated wheel speed difference at a second predetermined interval longer than the first predetermined interval; and
   determining a timing of estimating the friction coefficient only when the calculated change rate is less than a predetermined reference.

35. A control system for a vehicle comprising:
   speed detecting means for detecting a speed of each of vehicle front and rear wheels;
   deceleration calculating means for calculating a deceleration of a vehicle body;
   difference calculating means for calculating a difference in the detected speeds of the front wheel and the rear wheel;
   timing determining means for determining a timing of estimating a road surface friction coefficient based on the calculated speed difference; and
   estimating means for estimating the friction coefficient based on the calculated deceleration, and irrespective of the calculated speed difference, at the timing determined by the timing determining means.

36. A control system according to claim 35, further comprising:
   skid control means for controlling a skidding of the vehicle front and rear wheels when a skid control condition is established; and
   changing means for changing the skid control condition based on the estimated friction coefficient.

37. A control system for a vehicle comprising:
   speed detecting means for detecting a speed of each of vehicle front and rear wheels;
   deceleration calculating means for calculating a deceleration of a vehicle body at every predetermined period based on the detected wheel speed;
   difference calculating means for detecting a difference in the detected speeds of the front wheel and the rear wheel;
   integration means for integrating the calculated difference for the predetermined period;
   comparison means for comparing the integrated difference with a predetermined reference;
   holding means for holding the calculated deceleration unchanged irrespective of changes in the calculated deceleration when a comparison output indicates that the integrated difference exceeds the predetermined reference; and
   control means for controlling a braking operation of the vehicle based on the calculated deceleration.

38. A control system according to claim 37, further comprising estimating means for estimating a friction coefficient of a road surface based on the calculated deceleration, the estimated friction coefficient being used by the control means in controlling the braking operation.

* * * * *

UNITED STATES PATENT AND TRADEMARK OFFICE
CERTIFICATE OF CORRECTION

PATENT NO.   : 6,023,649
DATED        : February 8, 2000
INVENTOR(S)  : Matsuura et al.

It is certified that error appears in the above-identified patent and that said Letters Patent is hereby corrected as shown below:

ON TITLE PAGE: Please change:

"[22] Filed: Feb. 12, 1996" to --[22] PCT Filed: Apr. 28, 1995--.

Please add:   --[86] PCT No.: PCT/JP95/00859

§ 371 Date:   Feb. 12, 1996

§ 102(e) Date: Feb. 12, 1996--;

Under "[30] Foreign Application Priority Data," please delete

"Apr. 28, 1995 [JP] Japan..................PCT/JP95/859

Signed and Sealed this

Nineteenth Day of June, 2001

*Attest:*

NICHOLAS P. GODICI
*Attesting Officer*     *Acting Director of the United States Patent and Trademark Office*